United States Patent [19]

Hendershot

[11] Patent Number: 4,883,999

[45] Date of Patent: Nov. 28, 1989

[54] POLYPHASE ELECTRONICALLY COMMUTATED RELUCTANCE MOTOR

[75] Inventor: James R. Hendershot, Rockford, Ill.

[73] Assignee: Pacific Scientific Company, Rockford, Ill.

[21] Appl. No.: 232,436

[22] Filed: Aug. 15, 1988

[51] Int. Cl.[4] .............................................. H02K 1/14
[52] U.S. Cl. .................................... 310/254; 310/179; 310/185; 310/188; 310/216
[58] Field of Search .................. 310/12, 13, 49 R, 179, 310/180, 184, 185, 188, 216, 254

[56] References Cited

U.S. PATENT DOCUMENTS

| | | |
|---|---|---|
| 1,773,074 | 8/1930 | Borreson . |
| 2,767,368 | 10/1956 | Kober . |
| 2,992,342 | 7/1961 | Schmidt et al. . |
| 3,077,555 | 2/1963 | Fredrickson . |
| 3,117,268 | 1/1964 | Madsen . |
| 3,149,256 | 9/1964 | Kohlhagen . |
| 3,210,644 | 10/1965 | Sparrow . |
| 3,327,185 | 6/1967 | Kawada . |
| 3,335,348 | 8/1967 | Gossel . |
| 3,426,225 | 2/1969 | Bakhuizen .......................... 310/254 |
| 3,452,229 | 6/1969 | Pimlott et al. . |
| 3,473,059 | 10/1969 | Levin et al. . |
| 3,482,156 | 12/1969 | Porath . |
| 3,501,664 | 3/1970 | Veillette . |
| 3,510,699 | 5/1970 | Fredrickson . |
| 3,518,473 | 6/1970 | Nordebo . |
| 3,535,604 | 10/1970 | Madsen et al. . |
| 3,590,353 | 6/1971 | Kobayashi et al. . |
| 3,621,312 | 11/1971 | Palmere . |
| 3,629,675 | 12/1971 | Porath . |
| 3,678,352 | 7/1972 | Bedford . |
| 3,683,248 | 8/1972 | Kobayashi et al. . |
| 3,743,906 | 7/1973 | Torok . |
| 3,806,785 | 4/1974 | DeValroger et al. . |
| 3,866,104 | 2/1975 | Heine . |

(List continued on next page.)

OTHER PUBLICATIONS

"A Comparison of the Performance of Two Different Types of Switched Reluctance Motors", R. Arumugam, J. F. Lindsay and R. Krishnan, Electric Machines and Power Systems, 12:281–286 (1987).

J. W. Finch et al., "Variable Speed Using Multi-Tooth Per Pole Switched Reluctance Motors," Depart. of Electrical & Electronic Eng., Univ. of Newcastle, England.

K. A. Regas et al., "Step-Motors that Perform Like Servos", Machine Design, Dec. 10, 1987, pp. 116–120.

"Variable-Reluctance Motor for Electric Vehicles", Books and Reports, NASA Technical Briefs, Nov./Dec. 1987, p. 90.

*Primary Examiner*—Patrick R. Salce
*Assistant Examiner*—Emanuel Todd Voeltz
*Attorney, Agent, or Firm*—Leydig, Voit & Mayer

[57] ABSTRACT

A motor structure and energization scheme provides a high efficiency electronically commutated reluctance motor that is characterized by less iron losses than conventional switched reluctance motors. Preferably, the motor operates without the reversal of the flow of flux in the member of the motor supporting the motor windings (e.g., the stator). Also, the flux switching frequency in the first member is reduced and preferably minimized. By eliminating flux reversals and minimizing the flux switching frequency, the electronically commutated reluctance motor is operable over a wide range of speeds with improved efficiency. Structurally, first and second members of the motor are mounted for relative movement. The first member includes unevenly spaced poles, whereas the second member includes evenly spaced poles. The poles of the first member are grouped into pairs separated by a space related to the even spacing of the poles on the second member. Adjacent pairs of poles on the first member are separated by a spacing which is not equal to the spacing between the poles of a pair. To provide for relative movement of the first and second members, each pair of poles on the first member are polarized to form poles of opposite polarity such that a magnetic circuit is formed joining the two adjacent poles of the pair.

34 Claims, 17 Drawing Sheets

U.S. PATENT DOCUMENTS

| | | |
|---|---|---|
| 3,978,356 | 8/1976 | Spiesberger . |
| 3,995,203 | 11/1976 | Torok . |
| 4,029,977 | 6/1977 | Chai et al. . |
| 4,035,680 | 7/1977 | Maeder . |
| 4,039,908 | 8/1977 | Maeder . |
| 4,143,289 | 3/1979 | Williams . |
| 4,234,808 | 11/1980 | Geppert et al. . |
| 4,253,053 | 2/1981 | Ray et al. . |
| 4,255,696 | 3/1981 | Field, II . |
| 4,348,605 | 9/1982 | Torok . |
| 4,354,126 | 10/1982 | Yates . |
| 4,358,696 | 11/1982 | Liu et al. . |
| 4,358,697 | 11/1982 | Liu et al. . |
| 4,371,817 | 2/1983 | Muller . |
| 4,458,184 | 7/1984 | Kawate . |
| 4,475,051 | 10/1984 | Chai et al. . |
| 4,486,678 | 12/1984 | Olson . |
| 4,514,667 | 4/1985 | Sakmann et al. . |
| 4,568,846 | 2/1986 | Kapadia . |
| 4,639,648 | 1/1987 | Sakamoto . |
| 4,647,802 | 3/1987 | Konecny . |
| 4,670,696 | 6/1987 | Byrne et al. . |
| 4,698,537 | 10/1987 | Byrne et al. . |
| 4,713,570 | 12/1987 | Mastromattei . |
| 4,748,362 | 5/1988 | Hedlund ............................. 310/254 |
| 4,754,178 | 6/1988 | Kavanaugh ......................... 310/254 |
| 4,758,752 | 7/1988 | Leenhouts .......................... 310/254 |

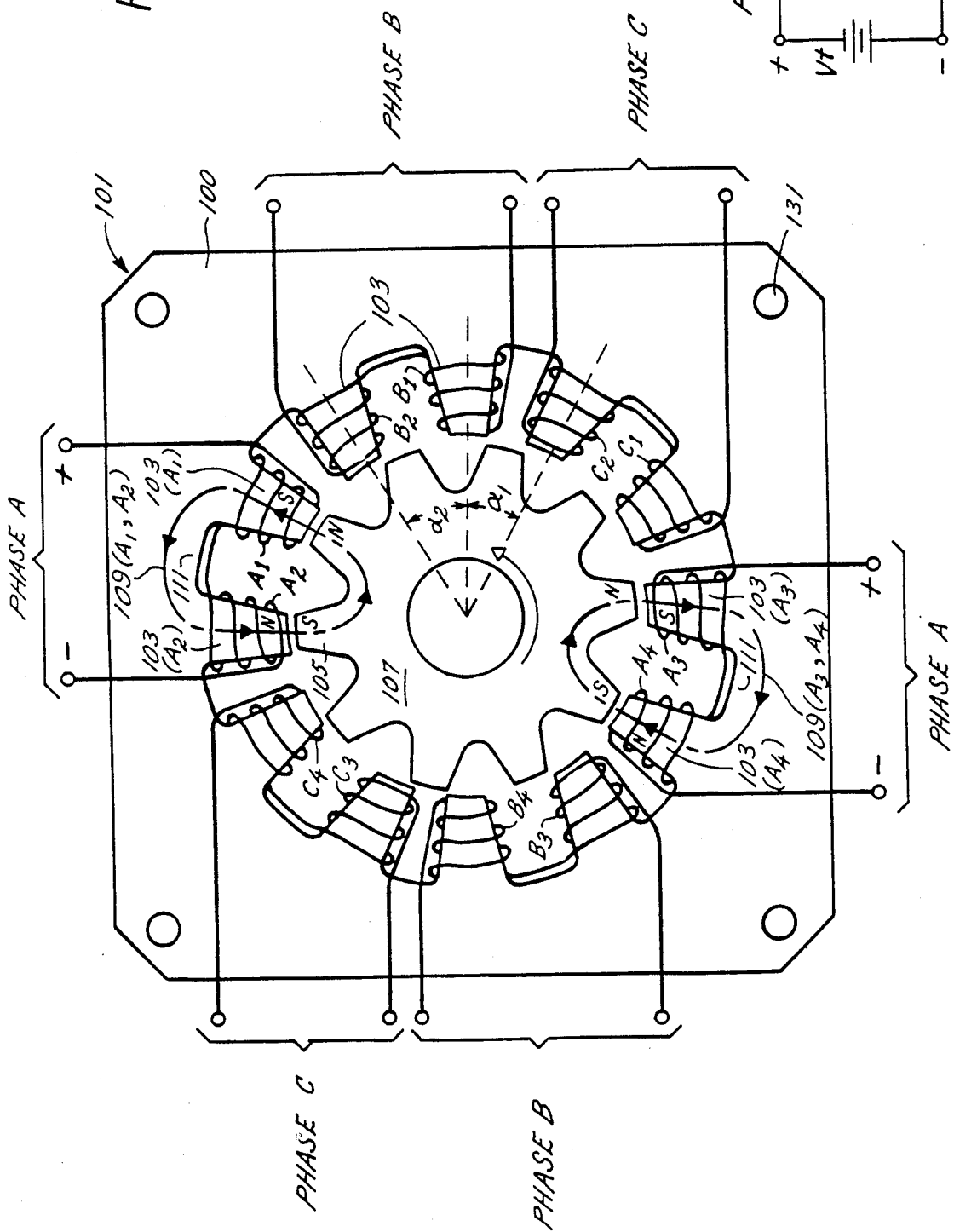

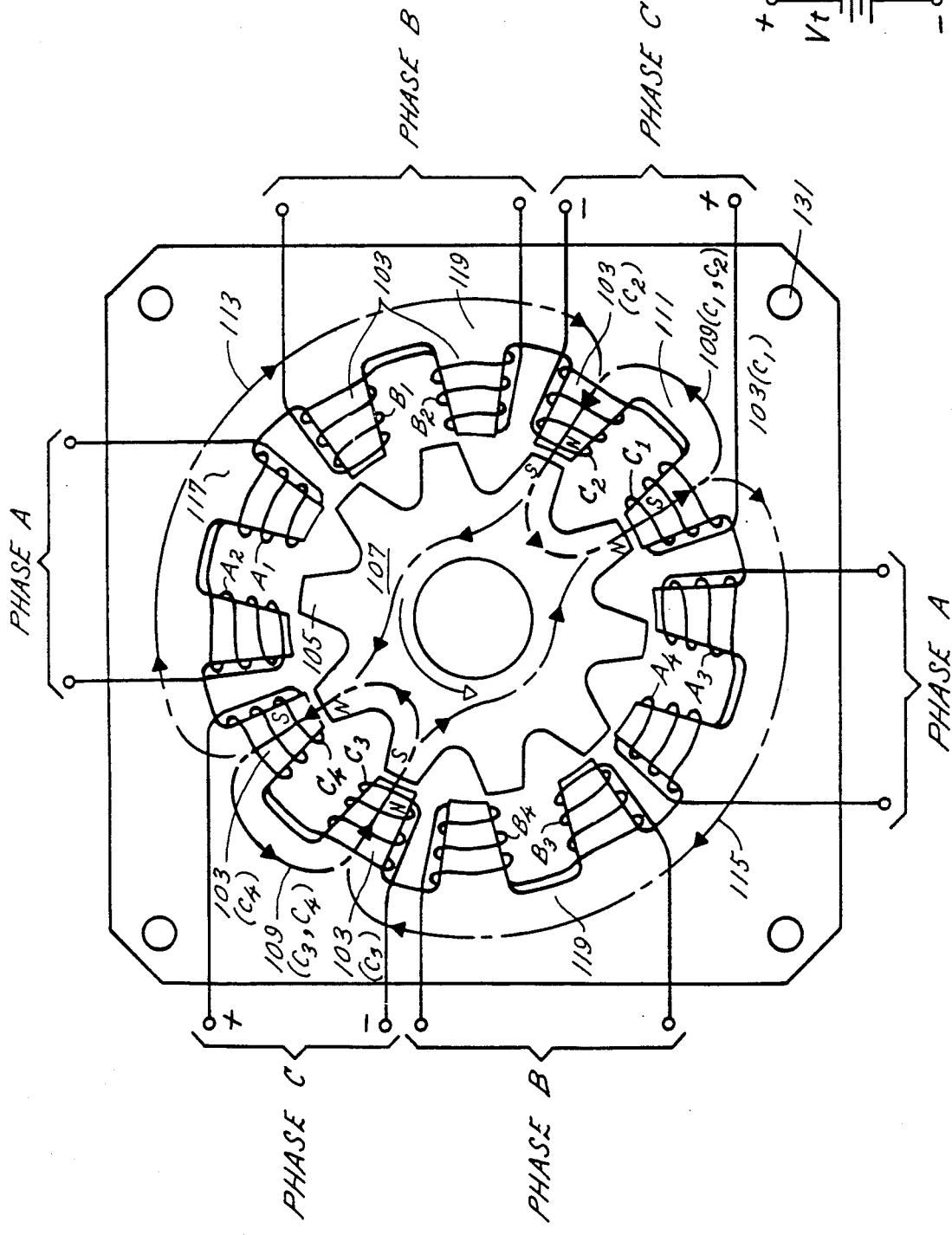

(PHASES AB)

(PHASES BC)

(PHASES CA)

(PHASES CA)

POLYPHASE ELECTRONICALLY COMMUTATED RELUCTANCE MOTOR

FIELD OF THE INVENTION

The invention generally relates to electronically commutated reluctance motors and more particularly to electronically commutated reluctance motors operated as continuously rotating variable-speed drives.

BACKGROUND OF THE INVENTION

The basic characteristics of electronically commutated reluctance motors operated as continuously rotating variable-speed drives are well known, since they are members of the class of variable reluctance motors, commonly used in stepper motor applications. As variable-speed drives, electronically commutated reluctance motors are designed for efficient power conversion rather than for particular torque or control characteristics typically required in stepper motor applications, and the pole geometry and control strategies differ accordingly. For example, the number of rotor poles is relatively small in an electronically commutated reluctance motor (cf., variable reluctance stepper motors), giving a large step angle, and the conduction angle is, generally, modulated as a function of both speed and torque to optimize operation as a variable-speed drive. As a term of art, these variable-speed reluctance motors are generally known as switched reluctance.

Because of recent developments in power semiconductor devices such as power MOSFETs and insulated gate thyristors (IGTs). Switched reluctance motors have gained attention relative to other types of motors suitable for variable-speed drive applications. This increased attention derives from the fact that switched reluctance motors compare very favorably with other types of motors typically used as variable-speed drives. For example, the speed versus average torque curves for switched reluctance motors are very similar to the curves for brushless permanent magnet (PM) motors—e.g., the curves are fairly linear with no discontinuities of torque. Additionally, switched reluctance motors are the cheapest type of motor to manufacture. They are rugged and robust and therefore well suited for heavy duty use. They have excellent heat dissipation qualities, and they do not require brushes or slip rings. The drive circuits for switched reluctance motors are the simplest and lowest cost compared to drives for other motors. Moreover, using state-of-the-art semiconductor technology for controllers, the efficiency of switched reluctance motors compare very favorably with other classes of variable-speed motors such as inverter-driven AC motor and PM motors.

Although the foregoing comparative features are favorable, switched reluctance motors are also known to have several disadvantages which are common to all variable-speed drive motors. Specifically, copper, hysteresis and eddy current losses limit motor efficiency, especially at relatively high RPMs.

SUMMARY OF THE INVENTION

It is a general object of the invention to provide a switched reluctance motor construction having improved performance characteristics. In this connection, it is a specific object of the invention to provide a construction for a switched reluctance motor which has a greater efficiency than switched reluctance motors of conventional construction, particularly at higher RPMs.

A related object of the invention is to provide a switched reluctance motor of improved efficiency without sacrificing the highly desirable features of conventional switched reluctance motors such as lowest manufacturing costs of any motor type, operation over a wide range of RPMs and very low losses from the end turns of stator windings.

It is a more particular object of the invention to substantially reduce losses in the back iron region of the stator of a switched reluctance motor. In this connection, it is a detailed object of the invention to significantly reduce hysteresis and eddy current losses in a switched reluctance motor.

It is yet another particular object of the invention to significantly improve the electrical response characteristics of switched reluctance motors in order to allow for operation of switched reluctance motors at very high speeds—e.g., greater than 10,000 RPM.

Other objects and advantages of the invention will be apparent from the following detailed description and the accompanying drawings.

Briefly, according to the invention, reversals of the flow of flux in a motor are eliminated so that hysteresis losses are significantly reduced relative to conventional switched reluctance motors. Moreover, the motor of the invention is constructed in a manner which allows for each area of the back iron of the stator to be incorporated into only one of the magnetic circuits formed by the motor and its drive. Such a construction greatly reduces the eddy current losses relative to conventional switched reluctance motors since the frequency of collapsing and building of magnetic fields in the back iron area of the stator is greatly reduced. By greatly reducing hysteresis and eddy current losses, the invention provides an electronically commutated motor that is characterized by significantly higher efficiency than prior art switched reluctance motors, while retaining all of the advantages of these prior art motors.

Electronically commutated reluctance motors according to the invention are hereinafter referred to as ECR motors. These ECR motors are characterized by first and second members mounted for relative rotation wherein one of the members has evenly spaced poles and the other member has unevenly spaced poles such that when the poles of each member are polarized they define pairs of adjacent poles having opposite polarities. In the illustrated embodiments of ECR motors, the rotor has evenly spaced teeth and the stator has unevenly spaced teeth. Although not an illustrated embodiment, the concepts of the invention may also be applied to an ECR motor having evenly spaced poles on the stator and unevenly spaced poles on the rotor.

In all embodiments of the invention, windings are wrapped about the poles of the stator in a manner which allows the poles of the stator to be energized as pairs of adjacent poles having opposite polarities so as to create a magnetic circuit between each of the pole pairs. Both poles of a pair are always excited together in any energization scheme utilized to drive the ECR motor, thereby ensuring the primary magnetic circuit formed by the pair is through the back iron area of the stator bridging the two poles. By ensuring the primary magnetic circuit formed by either pole in a pair is between the poles of the pair, flux reversals in the stator may be eliminated. Furthermore, by energizing the motor so that no magnetic circuits are generated which link stator pole pairs, each area of the back iron of the stator experiences a flux flow for only one phase. Thus, the switching frequency of the flux in the back iron of the stator is equal to the switching frequency of each phase. In contrast, the switching frequency of the flux in the back iron of conventional switched reluctance motors is typically three times the switching frequency of each phase. The switching frequency of the flux in the back iron of the stator is related to the eddy current losses of the motor. By reducing the switching frequency of the flux, eddy current losses are also reduced.

By providing the uneven spacing of teeth on either the stator or rotor, the energization schemes according to the invention provide torque to the rotor and allow positive control of the direction of rotor rotation. In order to provide a low reluctance path between stator and rotor, the poles of each pair of unevenly spaced poles are separated by a distance or angle equal to that of the evenly spaced poles of the stator or rotor. Such a relationship allows each pair of unevenly spaced poles to be aligned with an adjacent pair of evenly spaced poles so as to provide a low reluctance path for the flux flowing between the poles in the pairs. To ensure torque is generated at the rotor, the neighboring poles of adjacent pairs of unevenly spaced poles are separated by a distance that is not equal to the spacing between the evenly spaced poles or an integer multiple thereof.

Various energization schemes may be employed to power an ECR motor according to the invention. Using a polyphase source, the ECR motor may be driven so that only one phase is on at any given time, two phases on at any given time, etc., depending on the number of phases in the source. Also, the ECR motor may be energized by a hybrid scheme wherein the motor is at different times driven by a different number of phases. Such a scheme may be realized by merely partly overlapping the on times of each phase.

Each phase energizes one or more pairs of adjacent stator poles so that each pair comprises opposite poles which draw adjacent pairs of rotor poles into alignment, thus providing a low reluctance path for flux flowing between the pole tips of the polarized pair. When more than one pair of adjacent stator poles are energized at a time, the relative positions of the polarities of the poles in the pairs are preferably controlled so as to prevent the creation of secondary magnetic circuits linking two pairs of stator poles by way of a flux path that crosses the primary magnetic circuit of unenergized pairs of stator poles. These secondary magnetic circuits effectively increase the flux switching frequency for those portions of the stator back iron where the primary and secondary circuits overlap. To prevent the occurrence of such secondary magnetic circuits linking pairs of stator poles, the relative polarities of simultaneously polarized pairs are preferably maintained such that neighboring poles separated by unenergized pairs of poles are of the same polarity.

Depending upon the particular configuration of the ECR motor and the selected drive scheme, either a unipolar or bipolar drive may provide the foregoing polarization relationship between stator pairs. In order to maintain a unipolar drive, an ECR motor of the invention may be driven such that some secondary magnetic circuits are generated. Although these secondary magnetic circuits generate a flux flow which overlaps other magnetic circuits and thereby increases the eddy current losses from a minimum value, the directions of the flows in the overlapping area are the same. Accordingly, no flux reversals are generated and hysteresis losses are not substantially increased. For some applications, a slight decrease in efficiency caused by an increase in eddy current losses may be an acceptable trade-off to achieve the use of a less expensive, unipolar drive.

BRIEF DESCRIPTION OF THE DRAWINGS

FIG. 8a is a schematic cross-sectional view of a three-phase ECR motor according to a third embodiment of the invention where two pairs of stator poles are energized per phase and the rotor is aligned with stator poles of phase A in a one-phase-on operation;

FIG. 8d is the same cross-sectional view and energization of the ECR motor as shown in FIG. 8c, except the polarities of the stator poles have been rearranged to illustrate how an incorrect arrangement of polarities generates unwanted magnetic circuits;

FIG. 10b is the same cross-sectional view of the ECR motor shown in FIGS. 8a-8d, except the motor is shown as energized by a hybrid drive scheme during the time both phases A and B are on as indicated by FIG. 10a;

FIG. 10d is the same cross-sectional view of the ECR motor shown in FIGS. 8a-8d, except the motor is shown as energized by a hybrid drive scheme during the time both phases C and A are on as indicated by FIG. 10a;

FIG. 10e is the same cross-sectional view of the ECR motor shown in FIG. 10d, except a unipolar drive energizes the coils of phases C and A, thereby generating an extra but not harmful (no flux reversal) magnetic circuit once every cycle of the phase sequence;

While the invention will be described in connection with several alternative embodiments, there is no intent to limit the invention to those embodiments. On the contrary, the intent is to cover all alternatives, modifications and equivalents included within the spirit and scope of the invention as defined by the appended claims.

DETAILED DESCRIPTION OF THE ILLUSTRATIVE EMBODIMENTS

Figure 1:
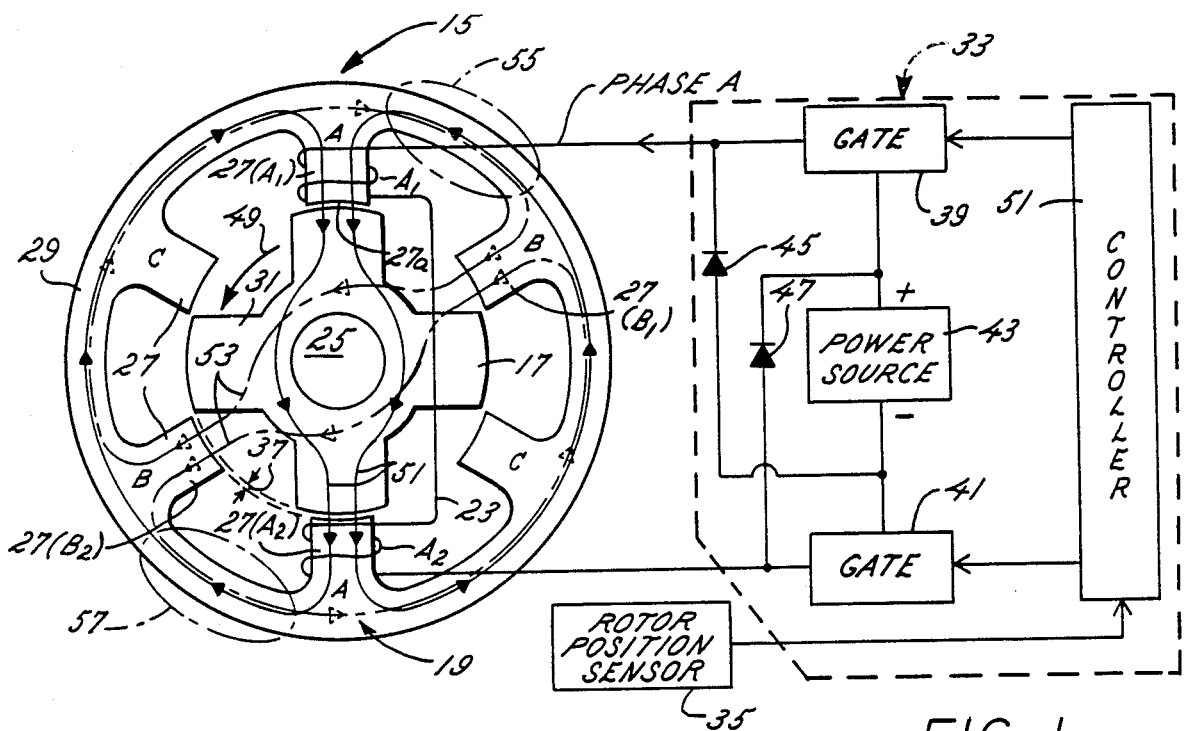
FIG. 1 a schematic cross-sectional view of a conventional switched reluctance motor construction, illustrated in a six stator pole and four rotor pole configuration.

Turning to the drawings and referring first to FIG. 1, a typical three-phase, prior art switched reluctance motor 15 is characterized by a rotor 17 without windings, permanent magnets or a commutator. Because the rotor 17 is without windings or permanent magnets, the rotor has a low inertia compared to AC or PM motors. A stator 19 is characterized by a relatively small number of copper phase windings (only one pair of series connected windings $A_1$ and $A_2$ is shown) and with very short end windings 23—a significant advantage over AC or PM motors which increases the efficiency of switched reluctance motors.

The rotor 17 which rotates about a steel shaft 25 is simply a stack of laminations comprising a magnetically permeable steel alloy. As suggested by FIG. 1, each rotor lamination is cut to form a number of salient poles which extend radially outwardly from the axis of rotor rotation and are circumferentially evenly spaced about the periphery of the rotor 17.

As with the rotor 17, the stator 19 is preferably formed by a stack of laminations made from a magnetically permeable steel alloy. In order to cause rotation of the rotor 17 as explained hereafter, the stator includes a number of salient poles 27 which is unequal to the number of salient poles 31 on the rotor 17. The stator poles 27 extend radially inwardly from an annular yoke 29 and are circumferentially and evenly spaced about the yoke.

The switched reluctance motor of FIG. 1 has six stator poles 27 and four rotor poles 31. Windings on diametrically opposite stator poles 27 are connected in series to form phases—three in this case (A, B and C). For ease of illustration, winding pairs B and C are not shown in FIG. 1; instead, the stator poles associated with these windings are labeled "B" or "C" accordingly. As those familiar with switched reluctance motors will appreciate, different combinations of the numbers of stator and rotor poles may be used—for example, an eight stator pole and six rotor pole combination will give a four-phase machine with a nominal 15° angle of rotor rotation for each commutated phase. The six stator pole and four rotor pole motor shown in FIG. 1 has a step angle of 30°. For identification of particular stator poles 27, reference hereinafter will be made to the stator pole and its winding—e.g., in FIG. 1 the stator poles of phase A are 27 ($A_1$) and 27 ($A_2$), where $A_1$ and $A_2$ comprise the winding pair for phase A.

The excitation of windings $A_1$ and $A_2$ of phase A magnetizes both the stator 19 and the rotor 17. As illustrated, this excitation produces a torque causing the rotor 17 to align its poles 31 with the excited stator poles 27 ($A_1$) and 27 ($A_2$). The polarity of the torque does not depend on the polarity of the current since the rotor 17 is always attracted to the stator 19 and will rotate to an orientation which provides a minimum reluctance path between energized poles. Consequently, the switched reluctance motor requires only unipolar current through the phase windings and from a drive generally indicated as 33 in FIG. 1. Sequential excitation of the phase windings A, B and C provides a "one-phase-on" operation which causes the rotor 17 to rotate and synchronously align the poles 31 of the rotor with those excited on the stator 19. In a conventional manner, a shaft position sensor 35 provides to the drive 33 the rotor position information necessary for synchronization of the rotor rotation and phase excitation.

Torque in the switched reluctance motor is proportional to the rate of increase of flux carried by the rotor and stator poles 31 and 27, respectively, as they rotate into alignment. Both air-gap reluctance and pole reluctance simultaneously decrease as the rotor 17 rotates into a position that is radially aligned with the energized stator poles 27 ($A_1$) and 27 ($A_2$). It is known that magnetic saturation in the air gap region and pole tips of the switched reluctance motor can significantly enhance the torque output. In this regard, the desire for pole tip saturation to increase output torque dictates a radially length of an air gap 37 as small as possible for reasonable manufacturing ease.

Referring to the drive 33 for the switched reluctance motor shown in FIG. 1, only the basic electrical circuit used to drive the phase A windings $A_1$ and $A_2$ of the switched reluctance motor is illustrated. It will be appreciated that the drive 33 includes similar electrical circuitry for phases B and C. For phase A, when the gates 39 and 41 of the drive 33 are closed, current builds up in the windings $A_1$ and $A_2$ under the excitation of direct voltage from a power source 43. When the gates 39 and 41 are open, the current transfers to the diodes 45 and 47, and the windings $A_1$ and $A_2$ see the reverse voltage which causes the current to collapse. Pulses of current are thereby supplied to each of the phases A, B and C in sequence and, for motoring operation, each pulse causes the most adjacent rotor pole to move towards alignment with the energized stator pole.

As indicated by the arrow 49, the rotor 17 steps around in the opposite direction to the sequence of stator pole excitations as is well known in the art. It should be noted, however, that thinking in terms of "steps" of rotor rotation is only helpful from the viewpoint of understanding the rotation—in practice the current pulses are controlled by the controller 51 in response to the rotor position sensor 35 to occur at specific angles $\theta$ of the rotor. The commutation of the current is controlled to occur at specific rotor angles $\theta$ in order to give a smooth rotational transition of a rotor pole 31 passed an attracting stator pole 27 in order to ensure continuous rotation without cogging. This generally means that a phase winding is substantially de-energized before the stator and rotor poles 27 and 31 align.

Figure 2:
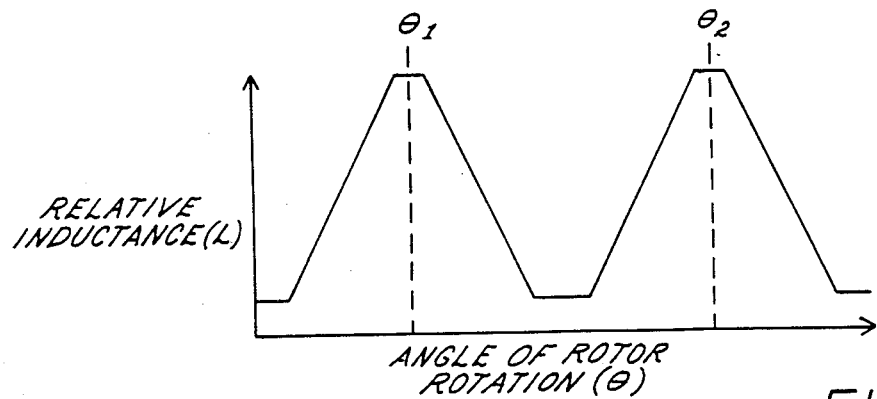
FIG. 2 is an exemplary and idealized graph illustrating a cyclic variation of inductance L experienced by a given phase relative to a mechanical angle $\theta$ of the rotor.

Briefly turning to a more detailed discussion of motor operation, motoring torque in an switched reluctance motor is produced if a phase is energized during the time interval when the inductance of the phase is increasing (i.e., a rotor pole is approaching a stator pole of the phase). A given phase undergoes a cyclic variation of inductance as rotation occurs. Making the simplistic assumption that the inductance L is independent of the current, this variation is shown in FIG. 2 for each stator pole in a phase. A first rotor pole aligns with the stator pole at a rotor angle of $\theta_1$. With continued rotor rotation, the next alignment of a rotor pole occurs at $\theta_2$. As can be seen, the inductance L is the greatest when a rotor pole is aligned with the stator pole. In the fourpole rotor of FIG. 1, the difference $\theta_2 - \theta_1$ equals 45°, since the rotor poles are evenly spaced. The mechanical angle of rotor rotation between low inductance points is hereinafter referred to as the "stroke angle."

Figure 3:
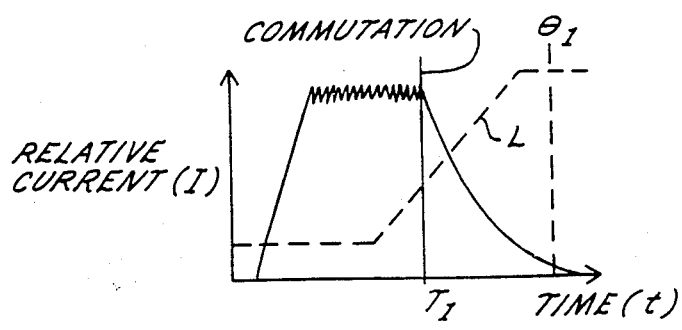
FIG. 3 is an exemplary graph of a current waveform for a given phase relative to the time t of mechanical rotation of the rotor, illustrating how the commutation of a phase must lead the mechanical rotation of the rotor in order to ensure continuous motoring.

For continuous rotation of the switched reluctance motor, the timing of a typical energizing current pulse applied to a winding relative to the time of rotor angle $\theta_1$ is shown in FIG. 3. Energy is controllably supplied during the period up to the commutation time $T_1$, by the opening and closing of gates 39 and 41—i.e., pulse-width modulation. To ensure motoring operation with no more than acceptable ripple torque, the commutation time $T_1$ occurs at a time before the mechanical angle $\theta_1$ is reached; that is, the phase winding is commutated before stator and rotor poles 27 and 31 align. Also, by commutating during a time of rising inductance L, a maximum amount of energy may be converted to motoring and a minimum to generating. In other words, during excitation of a phase by a current I, some of the energy is converted to mechanical output, some is stored in the magnetic field and some is lost in the copper or iron. During the period after commutation, the continued rotation of the rotor 17 partly returns the energy to the supply and partly converts it to further mechanical output and losses.

The primary source of losses in an switched reluctance motor occurs in the stator 19. The losses in the stator 19 primarily consist of hysteresis and eddy current losses. To reduce the eddy current losses, the stator 19 and rotor 17 are constructed of a laminated steel alloy as previously indicated. Eddy current losses, however, remain significant and are related to the frequency of the cyclic building and collapsing of magnetic fields in the stator. In conventional switched reluctance motors such as the motor of FIG. 1, all portions of the back iron experience a cycle of building and collapsing magnetic fields in response to energization of the motor by each phase. The frequency of this cyclic building and collapsing of magnetic fields in the stator is hereinafter called the "flux switching frequency." In the conventional motor of FIG. 1, the flux switching frequency in the back iron of the stator is equal to three times the phase switching frequency or commutation frequency.

As for the hysteresis losses, the frequency of flux reversal effects their magnitudes. Flux reversals are created when the direction of flux flow in overlapping magnetic circuits conflict. Such a conflict can occur using various drive schemes. Typically, the stator poles do not experience flux reversals. However, segments of the back iron or yoke 29 of the stator 19 may experience a flux reversal for each switching of the phases, the rotor poles 31 may experience as many as one flux reversal per revolution.

Because of non-linearities introduced by operation of the switched reluctance motor in saturated conditions, the procedure for calculating losses in a switched reluctance motor is complex. However, an easy and quantitative comparison can be made between conventional switched reluctance motors and motors according to the invention since it is known that the flux switching frequency and the frequency of flux reversals in the back iron of the stator are related to eddy currents and hysteresis losses in the motor, the two primary sources of iron losses in motors.

With opposing stator poles 27 ($A_1$) and 27 ($A_2$) associated with phase A as is shown in FIG. 1, the windings $A_1$ and $A_2$ are oppositely wound about the poles so that one pole face 27a has a north polarity and the other has a south polarity. With this configuration, the flux path is, as indicated by the solid lines 51, through the rotor 17 and around the back iron 29 of the stator 19. Upon energization of stator poles 27 ($B_1$) and 27 ($B_2$) by phase B, the associated windings (not shown) will set up a flux pattern similar to that developed by windings $A_1$ and $A_2$ of phase A as indicated by a dashed lines 53. For the segments 55 and 57 of the back iron or yoke 29, it can be seen that the direction of the flow of the flux reverses from phases A to B. Similar flux reversals occur in other segments of the yoke 29 when phase B is turned off and phase C is turned on. A third pair of segments of the back iron or yoke 29 experiences flux reversal when phase C is turned off and phase is turned on. Collectively, the pairs of back iron segments account for the entire area of the yoke 29. The same type of flux reversal occurs during "two-phase-on" operation of the three-phase switched reluctance motor in FIG. 1.

Because the flux paths for each phase extends around the entire back iron area of the yoke 29, each portion of the back iron area is incorporated into three flux paths—one from each phase. Accordingly, every portion of the back iron experiences a flux switching frequency that is three times the switching or commutation frequency of each phase. More generally, conventional switched reluctance motors such as the motor of FIG. 1 are characterized by a flux switching frequency in the back iron of the stator which is equal to the commutation frequency multiplied by the number of phases energizing the motor.

For a six stator, four rotor pole arrangement as shown in FIG. 1, one complete revolution of the rotor requires four cycles of the phase sequence A, B, C. In terms of motor RPM, each segment of the back iron or yoke 29 experiences a flux change twelve times per one complete rotor revolution and a phase reversal four tires. Operating at 7,500 RPM, the flux switching frequency and frequency of flux reversal in the stator of FIG. 1 are 1500 HZ and 500 HZ, respectively. As previously indicated, these frequencies are indicative of core losses in the stator primarily related to eddy current and hysteresis losses, respectively.

In accordance with one important aspect of the invention, a motor construction and energization scheme are provided which minimizes the flux switching frequencies and eliminates flux reversals in the back iron or yoke of the stator of an electronically commutated reluctance motor, hereinafter called an ECR motor. ECR motors substantially reduce eddy current and hysteresis losses and increase motor efficiency, especially at higher RPMs (e.g., 2,000 RPMs and more). In this regard, the motor construction of the invention is believed to provide high efficiency operation over a wide range of speeds, including speeds as low as several hundred RPMs and in excess of 20,000 RPMs. In order to eliminate flux reversals in at least the stator of the ECR motor, adjacent stator poles are polarized so as to have opposite polarities. In addition to the elimination of flux reversals, energizing adjacent stator poles minimizes the back iron of the stator in the magnetic path. By minimizing the back iron in the magnetic flux path, energy losses caused by the collapsing and building of a magnetic field in the back iron are greatly reduced. Specifically, the ECR motor is energized in a manner to prevent or at least reduce (relative to conventional switched reluctance motors) the overlapping of magnetic fields in the back iron of the stator. By eliminating or reducing the occurrence of overlapping magnetic fields in the back iron, the frequency of collapsing and building magnetic fields is drastically reduced. As a result of this reduction, eddy current losses are substantially less in an ECR motor than in a conventional switched reluctance motor.

To ensure rotation of the rotor with a flow of flux between adjacent pole pairs, the stator pole teeth are unevenly spaced about the stator. Moreover, the uneven spacing allows control of the direction of rotor rotation. Specifically, the angle between adjacent pole pairs forming non-overlapping magnetic circuits (i.e., inter-pair angle) and the angle between adjacent stator poles in a pole pair (i.e., intra-pair angle) are different. Stated differently, the angle between adjacent stator poles alternates between first and second angles.

For the purpose of illustrating the principle of the invention, FIGS. 4–6 are exemplary of ECR motors according to the invention having one pair of adjacent stator poles for each phase of a polyphase source. The ECR motor of FIGS. 4–6 have three pairs of stator poles for a three-phase source. In contrast to the one pair of stator poles per phase construction exemplified by FIGS. 4–6, FIGS. 8–10 illustrate an exemplary embodiment of a motor construction according to the invention having more than one pole pair per phase. In the illustrated embodiment of FIGS. 8–10, two pole pairs per phase are shown; however, any number of pole pairs per phase is possible, depending on the desired performance characteristics. In this regard, applicant regards the one pair per phase design as ideally suited for very high speed applications because at high motor speeds the large torque ripple inherent from the large stroke angles relative to motors having two or more pole pairs per phase becomes insignificant. Conversely, the low torque ripple of motors having multiple pole pairs per phase makes such motors better suited for lower speed applications.

Because the torque applied to the one-pair-per-phase motor is unbalanced, applicant suspects the wearing of bearings may be reduced by the more balanced application of torque by a motor having two or more pole pairs per phase. However, a one-pair-per-phase motor may be ideally suited for low-cost and high-speed applications. Requirements of particular applications will determine which type of motor design is chosen. For example, if incorporated in a servomotor, the construction according to the invention would probably include more than two pole pairs per phase in order to ensure minimum torque ripple.

Figure 4A:
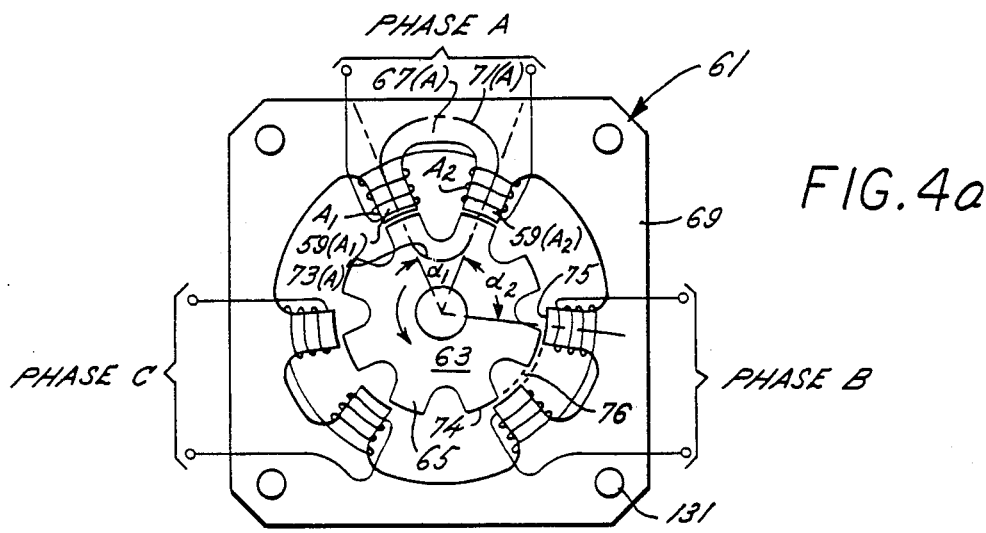
FIG. 4a is a schematic cross-sectional view of a three-phase electronically commutated reluctance (ECR) motor incorporating the invention, with the windings of the stator poles wound in accordance with a first embodiment and with the rotor aligned with an energized phase A in keeping with a one-phase-on operation.
Figure 4B:
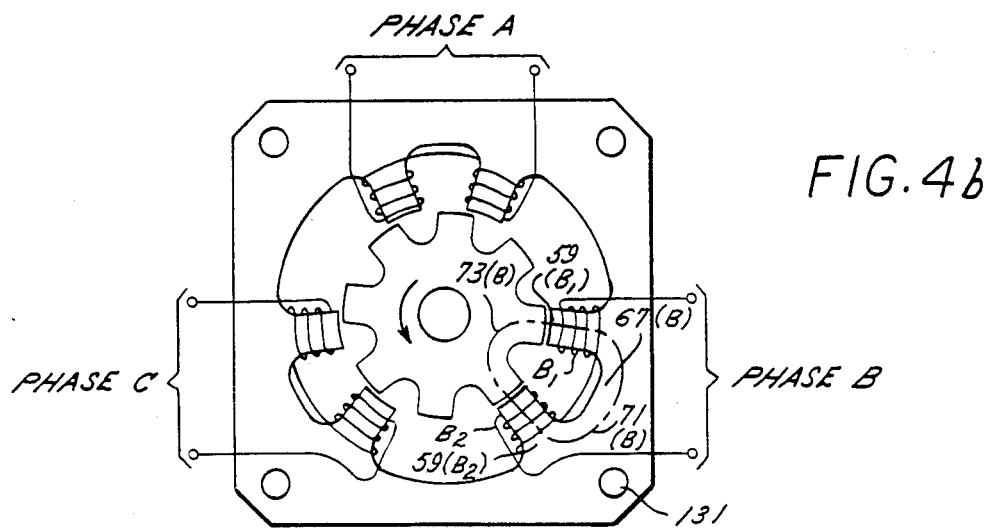
FIG. 4b is the same schematic cross-sectional view of a three-phase ECR motor shown in FIG. 4a, except the rotor has been rotated to align with an energized phase B.
Figure 4C:
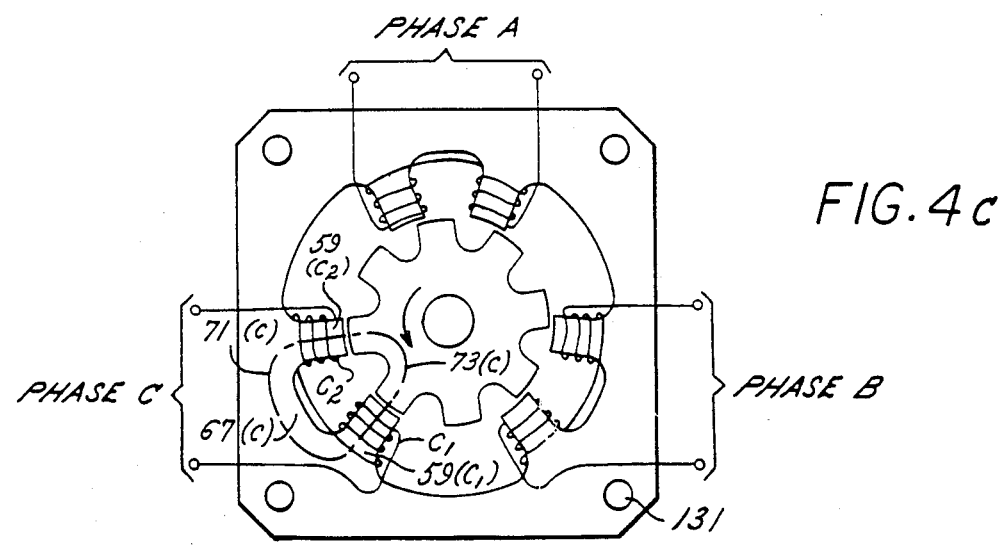
FIG. 4c is the same schematic cross-sectional view of a three-phase ECR motor shown in FIGS. 4a and 4b, except the rotor has been further rotated to align the rotor energized phase C.

Referring first to the one pair per phase design of FIGS. 4a–4c, the three pairs of adjacent stator poles 59 are circumferentially arranged about a stator 61. The two stator poles 59 in a pair are separated by an intra-pair angle of $\alpha_1$ as measured from the axis of rotation of the rotor 63. The adjacent stator poles 59 of neighboring pairs are separated by an inter-pair angle of $\alpha_2$. In order to provide for radial alignment of the rotor poles 65 with the stator poles 59 of a pair, the rotor poles 65 are spaced apart by the angle $\alpha_1$.

With phase A excited, a torque is created which draws the nearest poles 65 of the rotor 63 into alignment with the stator poles 59 ($A_1$) and 59 ($A_2$) associated with series connected windings $A_1$ and $A_2$ as indicated by FIG. 4a. In order to ensure continuous rotation (in contrast to step rotation), commutation of phase A leads the mechanical alignment of the rotor and stator poles as discussed in connection with FIGS. 1–3. In this regard, the radial alignment of adjacent pairs of stator and rotor poles illustrated in FIGS. 4–5 is intended only to aid in the understanding of the magnetic fields and not to imply a step-like rotation of the rotor 63.

Magnetic energy flows between the adjacent stator poles 59 ($A_1$) and 59 ($A_2$) in the, poles pair associated with phase A via an area 67(A) of the back iron or yoke 69 joining the two poles. To complete the magnetic circuit 71(A) for the flow of magnetic energy or flux through the stator pole pair 59 ($A_1$) and 59 ($A_2$), the pole faces of the rotor pole teeth 65 provide a bridge 73(A) that magnetically joins the pole faces of the stator pole pair. Also part of the complete magnetic circuit 71(A) are the areas of the radial air gap 75 interfacing the pole faces of the rotor poles 65 and the pole faces of the stator pole pair 59 ($A_1$) and 59 ($A_2$).

Digressing briefly, it will be appreciated that the particular dimensions of the pole faces 74 and 75 of the stator and rotor poles 59 and 65, respectively, define the nature of the radial air gap 76. For example, the pole faces may have arcuate shapes referenced to the axis of rotor rotation. Such shapes define a uniform air gap 76 illustrated in FIG. 4a. Non-uniform air gaps result from all other shapes of the pole faces. The particular shape chosen for the pole faces is a design consideration unrelated to the invention.

The stator and rotor poles 59 and 65 are preferably tapered as illustrated in order to provide structural resistance to deflection by the magnetic coupling between rotor and stator poles which may cause vibration and to aid in the creation of flux saturation at the pole faces. The taper is a radial taper and extends from the base of the poles to the pole faces. Of course, the area of the pole faces of the stator poles 59 are related, to the area of the pole faces of the rotor poles 65 in order to achieve desired operating characteristics as is conventional in the art.

As can be seen in FIGS. 4a–4c, the taper is not of equal slope on both sides of a stator poles 59. The slopes are adjusted in order to ensure sufficient space is provided for the windings $A_1$, $A_2$, $B_1$, $B_2$, $C_1$ and $C_2$ between the stator poles 59 separated by the smaller angle $\alpha_1$. In other words, instead of a symmetrical taper of the sides of each stator pole, the side including the angle $\alpha_1$ has a smaller taper than the side including the angle $\alpha_2$.

In a "one-phase-on" operation of the motor in FIGS. 4a–4c, after phase A is commutated, phase B energizes windings $B_1$ and $B_2$ as shown in FIG. 4b. The poles of the rotor closest to the adjacent stator poles 59 ($B_1$) and 59 ($B_2$) of phase B are pulled toward an aligned position with the energized poles. A magnetic circuit 71(B) for the flux is formed which is similar to the magnetic circuit 71(A) of phase A in that the flux primarily travels through the back iron section, 67(B) of the yoke 69 joining the two stator poles 59 ($B_1$) and 59 ($B_2$). For the flux exiting and entering the pole faces of stator poles 59 ($B_1$) and 59 ($B_2$), the rotor poles 65 (shown in a radially aligned position in FIG. 4b) provide a low reluctance path or bridge 73(B).

To complete the sequence of three-phase excitation, phase B is commutated and phase C is turned on. With phase C on, windings $C_1$ and $C_2$ polarize the associated stator poles 59 ($C_1$) and 59 ($C_2$). As with the stator poles of phases A and B, a magnetic circuit 71(C) is created through the polarized stator poles 59 ($C_1$) and 59 ($C_2$). To couple the magnetic poles of the pole pair energized by phase C, the magnetic circuit travels through an area 67(C) of the yoke 69 joining the two stator poles 59($C_1$) and 59($C_2$) and through a low reluctance path or bridge 73(C) in the rotor poles 65.

In order for the flux paths of the magnetic circuits to form a loop joining the adjacent stator poles in a pair, the two windings of each phase are wound opposite one another so that one pole tip is a north magnetic pole and the other is a south magnetic pole. In the configuration shown in FIGS. 4 and 5 where only one pair of stator poles is energized for each phase, it is arbitrary as to which pole tooth in a pair is magnetized north or south. Therefore, the polarity of the poles is not marked in FIGS. 4 and 5. However, as discussed hereinafter in connection with FIGS. 6–10, the assignment of north and south polarities in a pole pair is crucial to the invention when more than one pole pair are simultaneously energized.

From the foregoing, it can be seen that the motor of FIGS. 4a–4c has no flux reversals in the back iron area 69 of stator 61, and each portion of the back iron area which experiences cyclic building and collapsing of magnetic fields does so at a frequency equal to the commutation frequency. Both the ECR motor of FIGS. 4a–4c and the conventional switched reluctance motor of FIG. 1 are three-phase motors having six stator poles. However, in contrast to the ECR motor, the conventional switched reluctance motor experiences a flux switching frequency equal to the commutation frequency multiplied by the number of phases and a flux reversal frequency equal to the commutation frequency. Accordingly, the ECR motor is characterized by significantly less iron losses (eddy current and hysteresis) in the back iron area of the stator than the conventional switched reluctance motor of the same type.

Figure 5A:
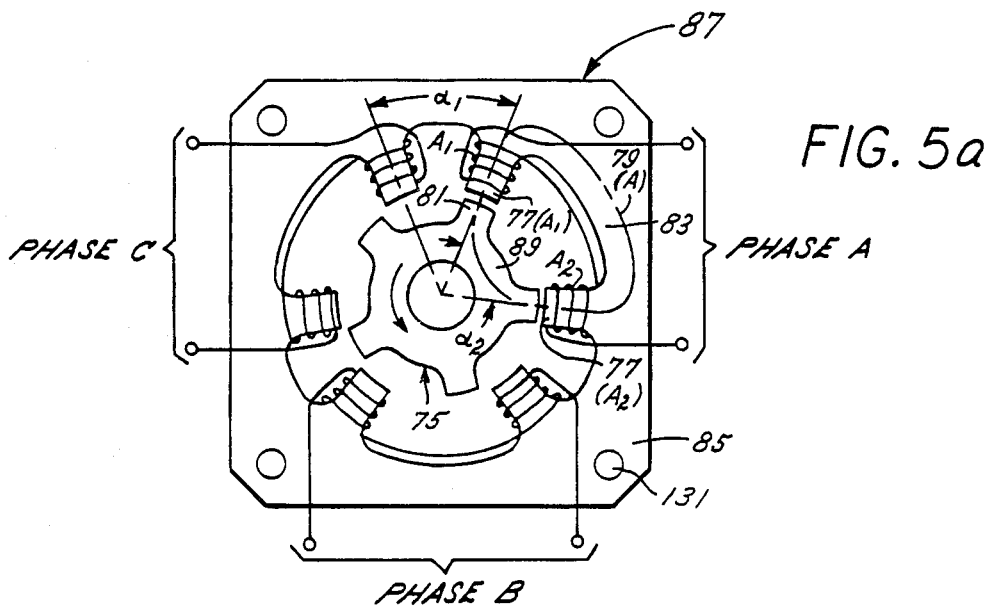
FIG. 5a is a schematic cross-sectional view of a three-phase ECR motor according to the invention where the windings of the stator poles are wound in accordance with a second embodiment and with the rotor aligned with an energized phase A in keeping with a one-phase-on operation.
Figure 5B:
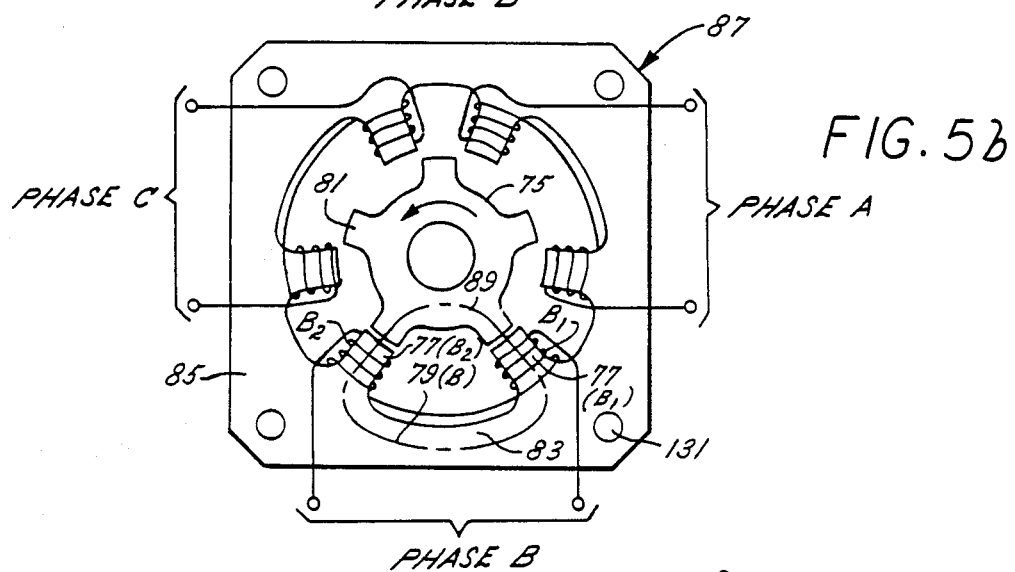
FIG. 5b is the same schematic cross-sectional view of a three-phase ECR motor illustrated in FIG. 5a, except the rotor has been rotated to align with an energized phase B.
Figure 5C:
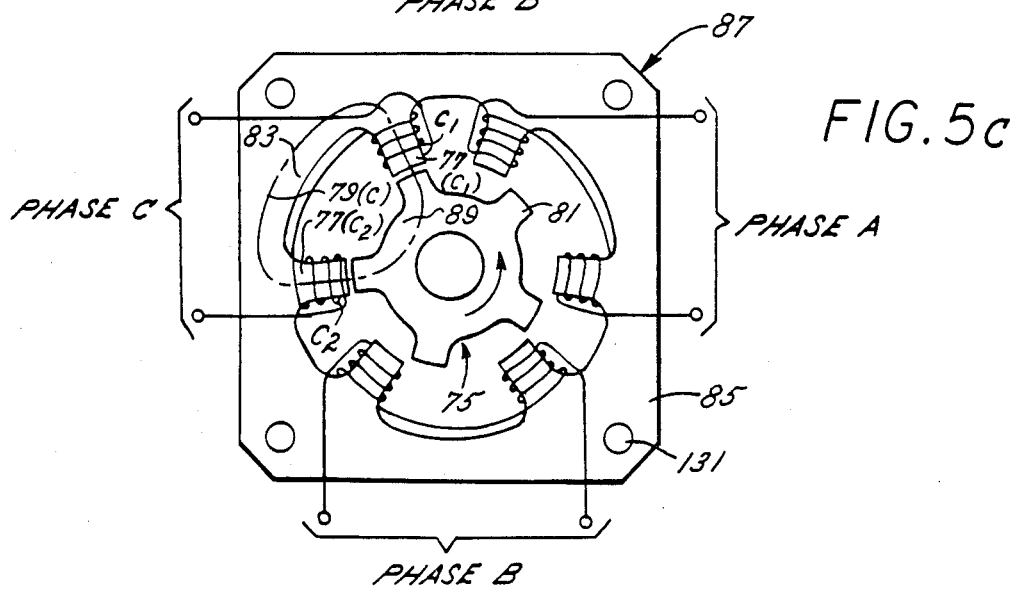
FIG. 5c is the same schematic cross-sectional view of a three-phase ECR motor illustrated in FIGS. 5a and 5b, except the rotor has been rotated to align with an energized phase C.

Like the motors of FIGS. 4a–4c, the ECR motor of FIGS. 5a–5c is a six stator pole motor energized by a "one-phase-on" drive scheme which rotates the rotor 75 in the same manner as described with respect to FIGS. 4a–4c. In contrast to the construction of FIGS. 4a–4c, the motor of FIGS. 5a–5c utilizes the larger angle $\alpha_2$ as the intra-pair angle and, therefore, the smaller angle $\alpha_1$ becomes the inter-pair angle. Like the motor of FIGS. 4a–4c, the polarity of the poles formed by individual stator poles is unimportant; however, the stator poles of the pole pair energized by each phase A, B or C must be oppositely polarized in order to generate rotor torque and the magnetic circuit according to the invention. As with the motor configuration of FIGS. 4a–4c, the windings for each phase are wound in a clockwise direction about one stator pole in a pair and in a counterclockwise direction about the other stator pole, thereby ensuring opposing poles for each pair.

With the foregoing construction, energization of phase A windings $A_1$ and $A_2$ polarizes stator pole 77 ($A_1$) and 77 ($A_2$) The polarized stator pole pair 77 ($A_1$) and 77 ($A_2$) generate the magnetic flux path or circuit 79(A) that imparts a torque to the rotor. The torque attempts to bring rotor poles 81 into alignment with the energized stator poles 77 ($A_1$) and 77 ($A_2$). As previously explained, by commutating the phases A, B and C before alignment occurs, a continuous synchronous rotation can be initiated and maintained.

Energization of phases B and C in FIGS. 5b–5c, respectively, generates magnetic circuits 79(B) and 79(C) similar to the magnetic circuit 79(A) of phase A in FIG. 5a. As can be easily appreciated from a comparison of the illustrations of FIGS. 5a–5c, each magnetic circuit forms a "direct" flux path through an area 83 of the back iron or yoke 85 of the stator 87, meaning that the path of flux flow does not overlap any portion of the magnetic circuits formed by the other phases. Because the back iron area 83 of each magnetic circuit 79(A), (B) or (C) is only between two adjacent stator poles, the flow of flux in the back iron 83 does not overlap the flow of flux in the back iron for the poles of other phases, thereby minimizing the flux switching frequency and assuring no flux reversals occur. For example, when the windings $B_1$ and $B_2$ are energized, the magnetic circuit 79(B), in the back iron 85 spans the adjacent stator poles 77 ($B_1$) and 77 ($B_2$), but no others. Similarly, when the windings $C_1$ and $C_2$ of phase C are energized, the magnetic circuit 79(C) through the back iron 85 of the stator 87 is only between adjacent stator, poles 77 (C1) and 77 (C2). As with the motor of FIGS. 4a–4c, the magnetic circuits are completed by a bridge 89 provided by polarized rotor poles 81.

In order to provide adjacent pairs of stator poles which form non-overlapping magnetic circuits according to the invention, the stator for all configurations of ECR motors necessarily is characterized by an even number of stator poles—i.e., two or multiples of two for each phase. Depending upon whether the motor phases are wound to the stator poles as shown in FIGS. 4a–4c (where the intra-pair angle is $\alpha_1$) or as shown in FIGS. 5a–5c (where the intra-pair angle is $\alpha_2$), either $\alpha_1$ or $\alpha_2$ equals $360/N_R$.

Referring again to FIGS. 4a–4c, when the stator pole pairs are defined by the poles separated by the smaller angle $\alpha_1$, the intra-pair angle $\alpha_1$ equals the angle separating adjacent rotor poles. Such a relationship allows a minimum reluctance to occur for each phase when the stator pole pair of the phase became radially aligned with the poles of the rotor as illustrated. Expressed generally, the angle $\alpha_1$ equals, $$\alpha_1 = \frac{360°}{N_R} \tag{1}$$

where $N_R$ is the number of evenly spaced poles on the rotor.

As for the inter-pair angle $\alpha_2$ in FIGS. 4a–4c, it can be appreciated from the illustration that the angles $\alpha_1$ and $\alpha_2$ define an angle of an arc occupied by one pair of stator poles. In this regard, the stator pole pairs are evenly distributed about the stator and separated by equal angles of $\alpha_1 + \alpha_2$. Knowing the distribution of the stator pole pairs and the total number of stator poles $N_s$, a relationship between the total number of stator pole and the circumferential distribution of pole pairs may be expressed generally as $$\frac{2}{N_s} = \frac{\alpha_1 + \alpha_2}{360°} \tag{2}$$

where $2/N_s$ is the ratio of the number of poles in one pair to the number of total poles and $(\alpha_1 + \alpha_2)/360$ is the ratio of the arcuate angle occupied by one pair to the total circle of the stator.

Substituting equation (1) into equation (2) and solving for $N_R$ gives the following:

$$N_R = \frac{360°}{720°/N_S - \alpha_2} \tag{3}$$

Using equation (3), the minimum number of rotor poles can be determined for a given number of stator poles in an ECR motor. For example, in a three-phase motor such as shown in FIGS. 4a–4c, the minimum number of stator poles is six (two for each phase). Equation (3) may be rewritten as follows when $N_S$ equals six.

$$N_R = \frac{360°}{120° - \alpha_2} \tag{4}$$

For the minimum number of rotor poles, setting $\alpha_2$ equal to zero, $N_R$ equals three; however, $\alpha_2$ cannot equal zero for the invention. Therefore, the minimum number of rotor poles $N_R$ must be four. Substituting the value four for $N_R$, equation (4) may be solved for the minimum value of $\alpha_2$.

$$\alpha_2 = 40° \text{ (min.)} \tag{5}$$

For the motor construction illustrated in FIGS. 4a–4c, there are eight rotor poles and six stator poles. Using equations (2), (3) and (4), $$\alpha_1 = 45° \tag{6}$$

$$\alpha_2 = 75° \tag{7}$$

For the motor construction illustrated in FIGS. 5a–5c and 6a–6c, there are five rotor poles and six stator poles. Again using equations (2), (3) and (4), but reversing $\alpha_1$ and $\alpha_2$ in the equations in order to account for the change in phase winding, the following values for $\alpha_1$ and $\alpha_2$ can be found.

$$\alpha_1 = 48° \tag{8}$$

$$\alpha_2 = 72° \tag{9}$$

More generally, equation (3) may be used to compile a table such as TABLE I below for all combinations of rotor and stator pole numbers for three, four, five, etc. phase systems. The various combinations of the number of phases and stator and rotor poles listed in TABLE I are only illustrative and are not intended to be limiting.

TABLE I

| PHASE | $N_S$ | $N_R/\alpha_2$ | $\alpha_1$ | $\alpha_2$ |
|---|---|---|---|---|
| 3 | 12 | 10/36° | 24° | 36° |
| 3 | 18 | 15/24° | 26° | 24° |
| 3 | 24 | 20/18° | 12° | 18° |
| 3 | 30 | 25/144° | 9.6° | 14.4° |
| 3 | 36 | 30/12° | 8° | 12° |
| 3 | 42 | 35/10.28° | 6.85° | 10.28° |
| 3 | 48 | 40/9° | 6° | 9° |
| 4 | 8 | 7/51.43° | 38.57° | 51.43° |
| 4 | 16 | 14/25.71° | 19.29° | 25.71° |
| 4 | 24 | 21/17.14° | 12.86° | 17.14° |
| 4 | 32 | 28/12.86° | 9.64° | 12.86° |
| 4 | 40 | 35/10.29° | 7.71° | 10.28° |
| 4 | 48 | 42/8.57° | 6.43° | 8.57° |
| 5 | 10 | 9/40° | 32° | 40° |
| 5 | 20 | 18/20° | 16° | 20° |
| 5 | 30 | 27/13.33° | 10.67° | 13.33 |
| 5 | 40 | 36/10° | 8° | 10° |
| 5 | 50 | 45/8° | 6.4° | 8° |
| 6 | 12 | 11/32.73° | 27.27° | 32.73° |
| 6 | 24 | 22/13.64° | 13.64° | 16.36° |
| 6 | 36 | 33/10.91° | 9.09° | 10.91° |
| 6 | 48 | 44/8.18° | 6.82° | 8.18° |

In keeping with the invention, the relative polarities of the pairs of stator poles are of critical importance when two or more pairs are simultaneously energized.

Figure 6A:
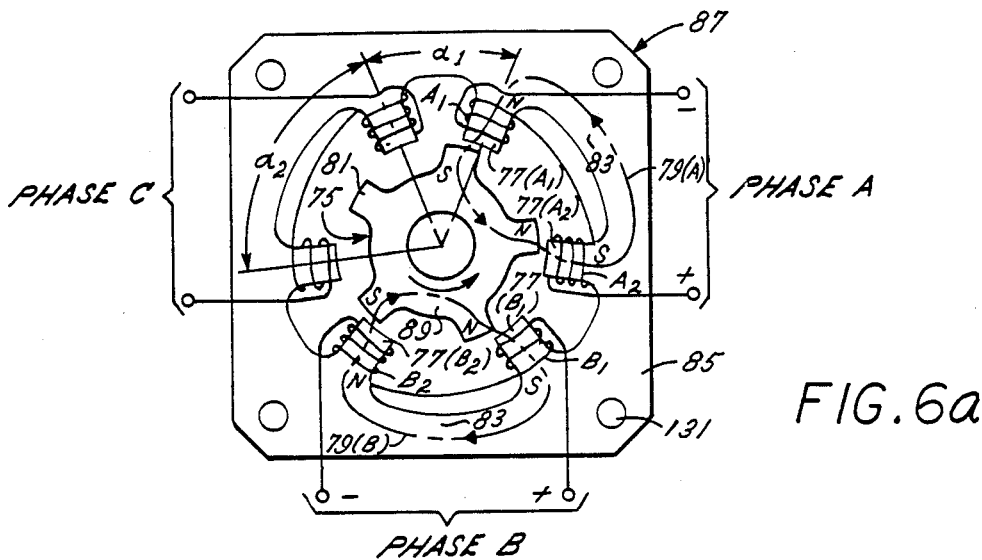
FIG. 6a is the same schematic cross-sectional view of a three-phase ECR motor incorporating the second embodiment of the invention as shown in FIGS. 5a–c, except the rotor is aligned with simultaneously energized A and B in a two-phase-on operation.
Figure 6B:
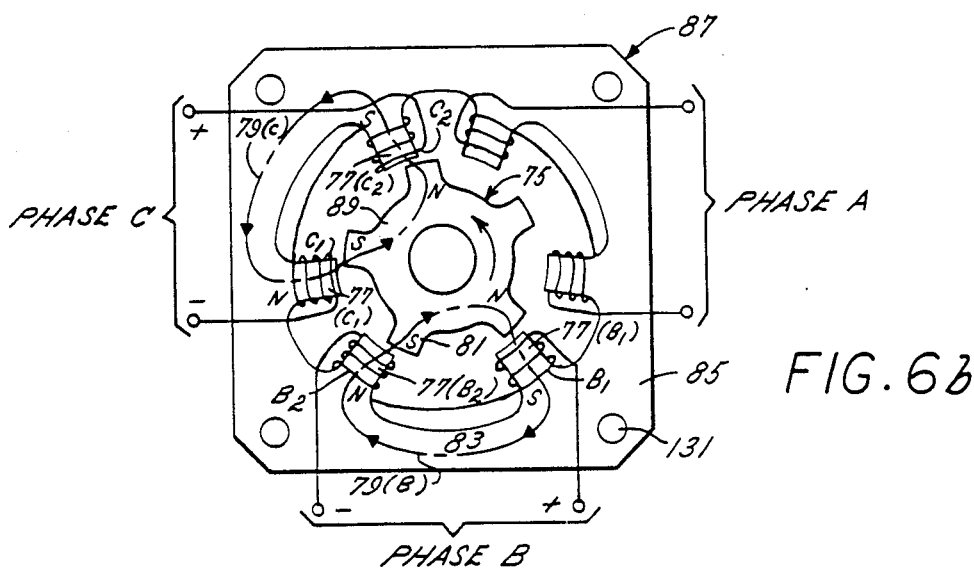
FIG. 6b the same schematic cross-sectional view of a three-phase ECR motor shown in FIG. 6a, except the rotor is rotated to align with simultaneously energized phases B and C.
Figure 6C:
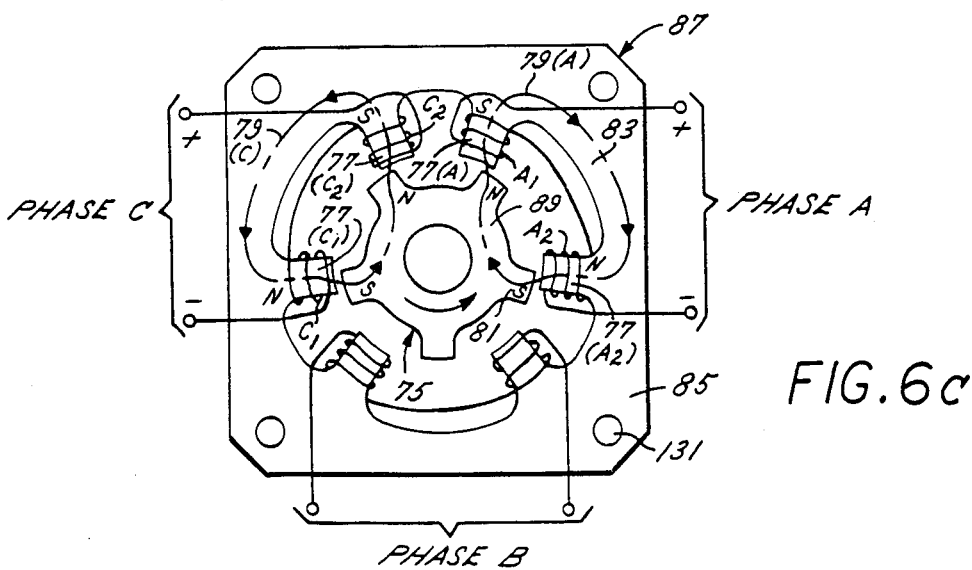
FIG. 6c is the same schematic cross-sectional view of a three-phase ECR motor shown in FIGS. 6a and 6b, except the rotor is rotated to align with simultaneously energized phases C and A.
Figure 7A:
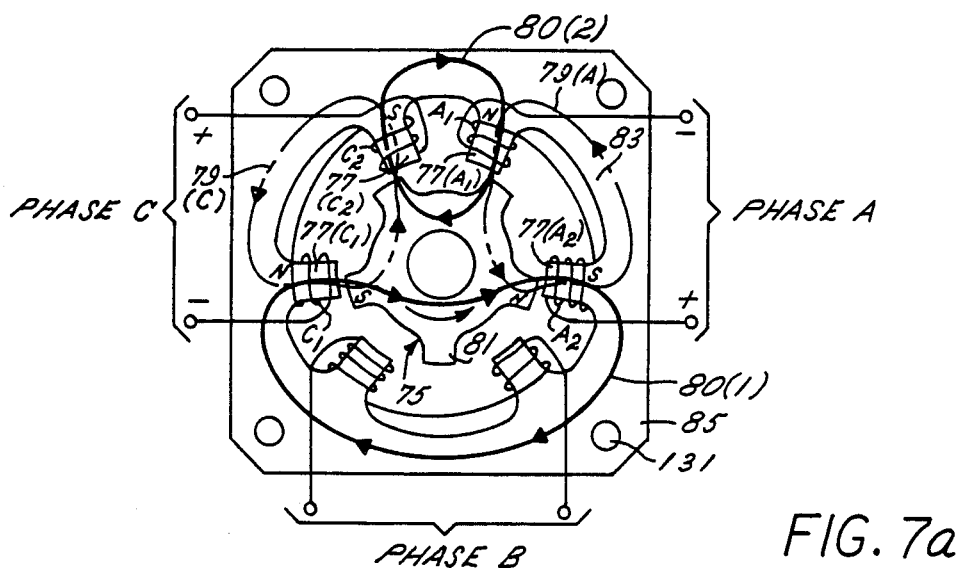
FIG. 7a is the same ECR motor illustrated in FIG. 6c, except the illustrated flux paths have been modified to indicate the magnetic circuits formed if the motor is not energized with a waveform as set forth in FIG. 7c.
Figure 7B:
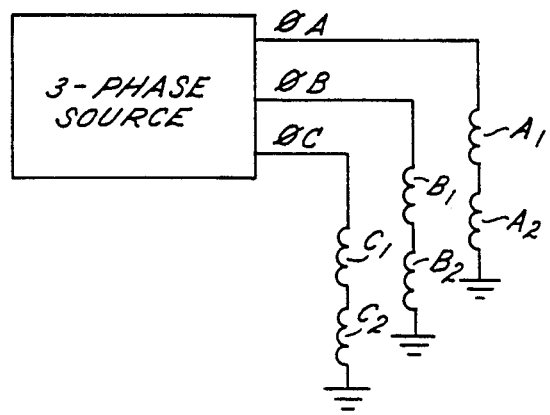
FIG. 7b is a schematic block diagram of an exemplary three-phase drive apparatus for exciting an ECR motor according to the invention, wherein more than one phase is excited at any time.
Figure 7C:
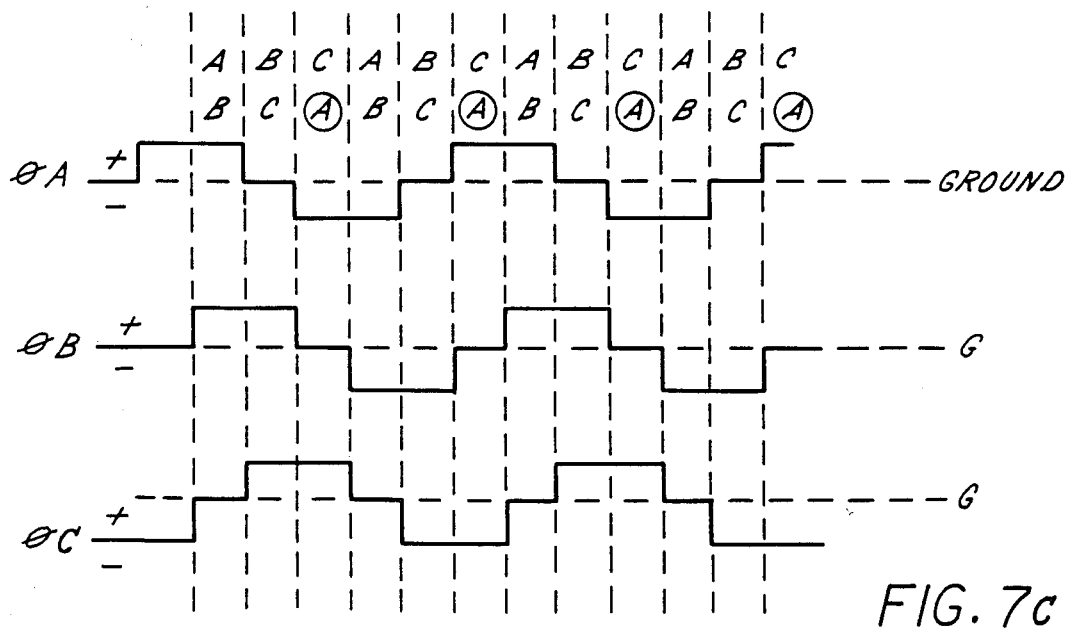
FIG. 7c a schematic diagram of the current waveforms produced by the three phases of the drive apparatus of FIG. 7b.
Figure 8B:
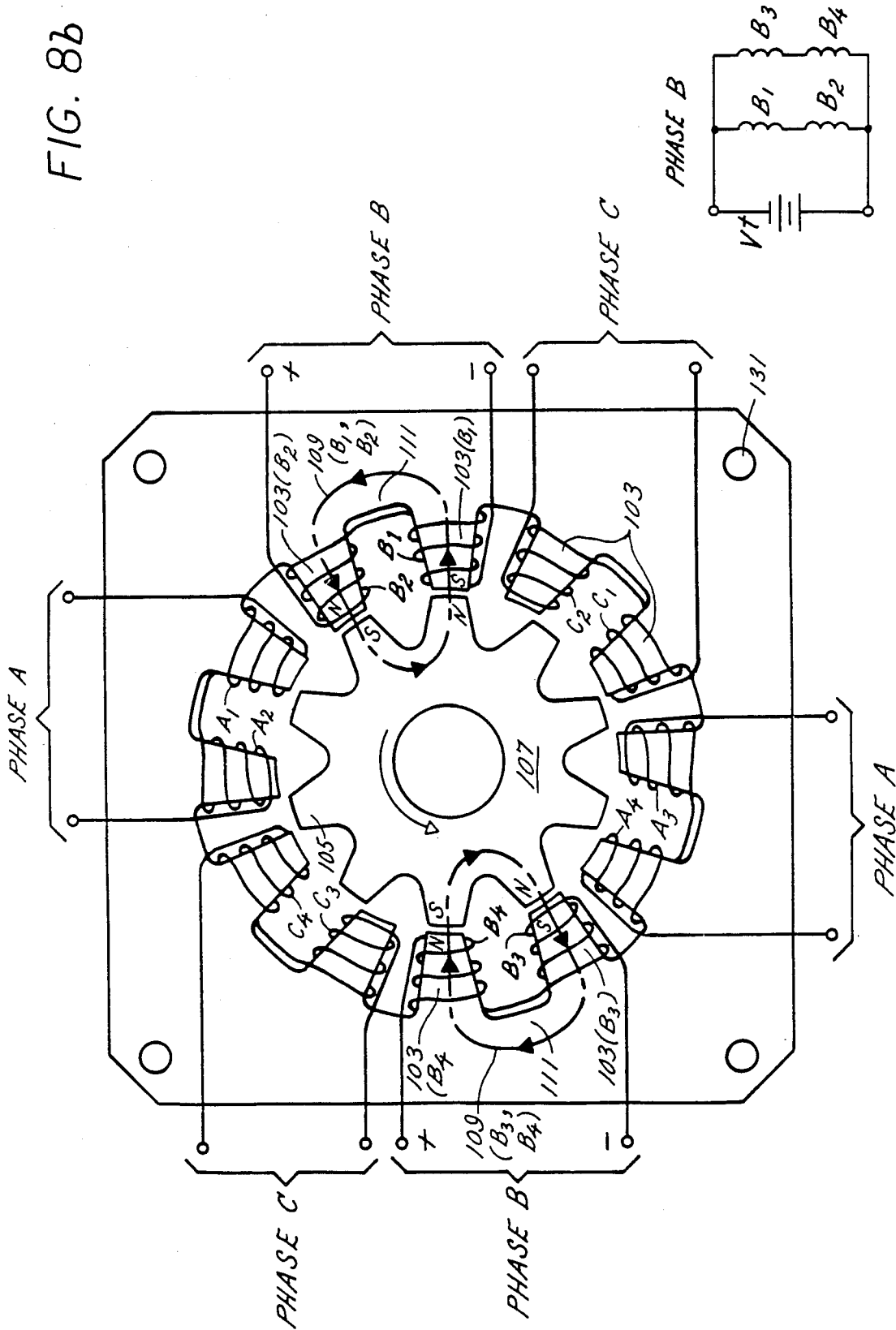
FIG. 8b is the same cross-sectional view of the ECR motor as shown in FIG. 8a, except the rotor is rotated to align with the stator poles of phase B.
Figure 8C:
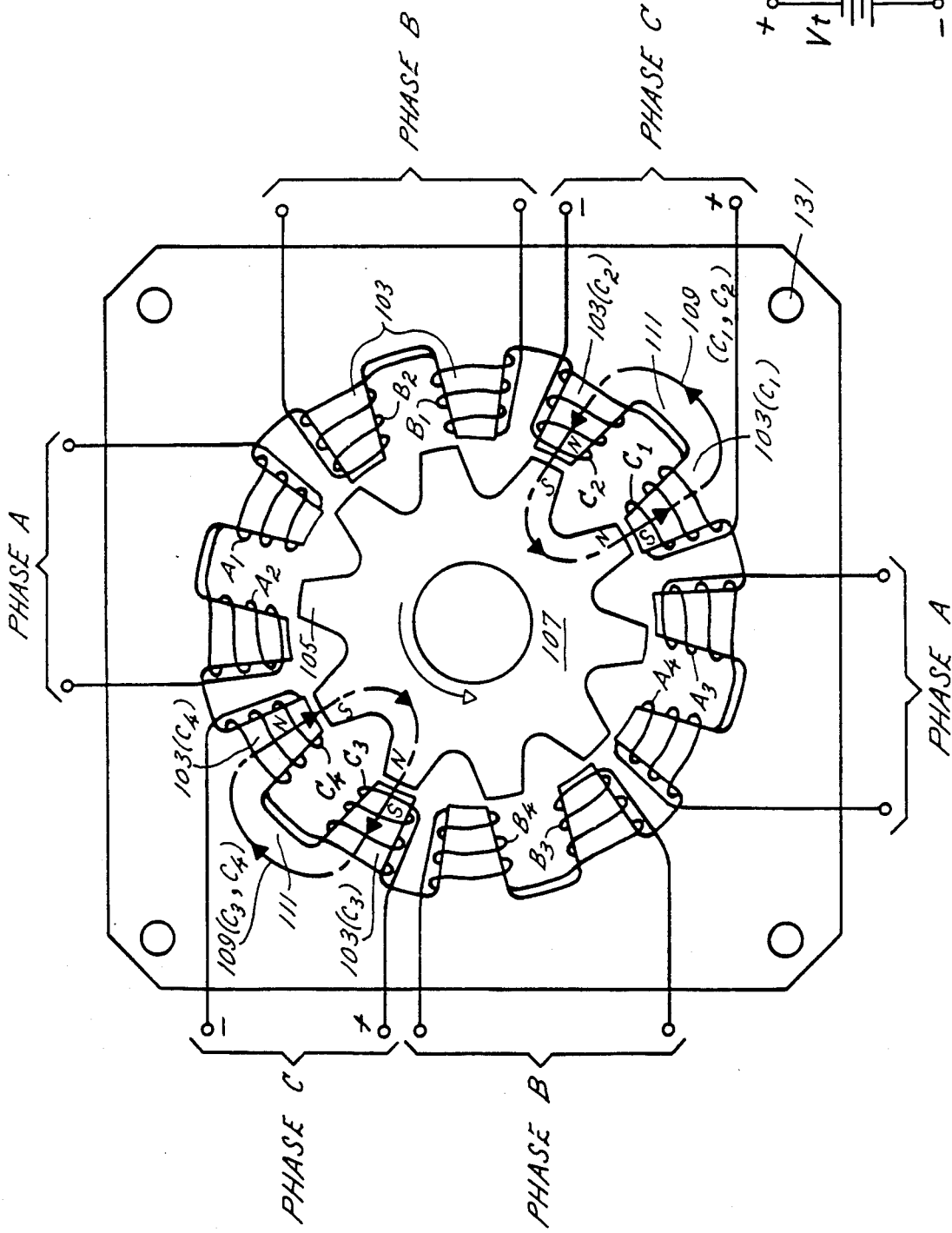
FIG. 8c is the same cross-sectional view of the ECR motor as shown in FIGS. 8a and 8b, except the rotor is rotated to align with the stator poles of phase C.
Figure 8C:
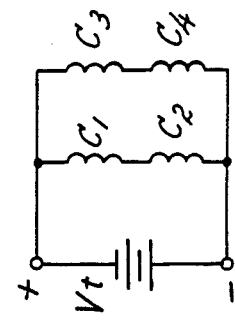
Figure 9A:
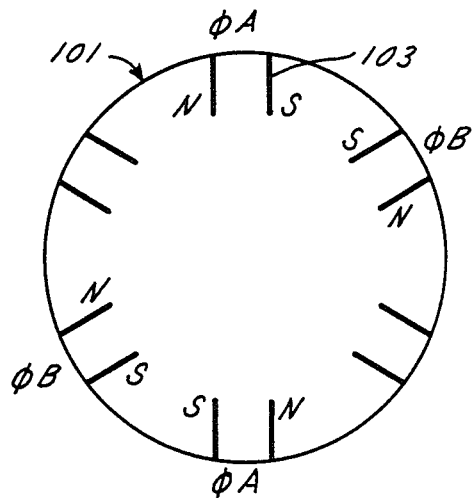
FIGS. 9a-9c are schematic diagrams of the ECR motor illustrated in FIGS. 8a-d, illustrating the polarities of the stator poles for a two-phase-on operation.
Figure 9B:
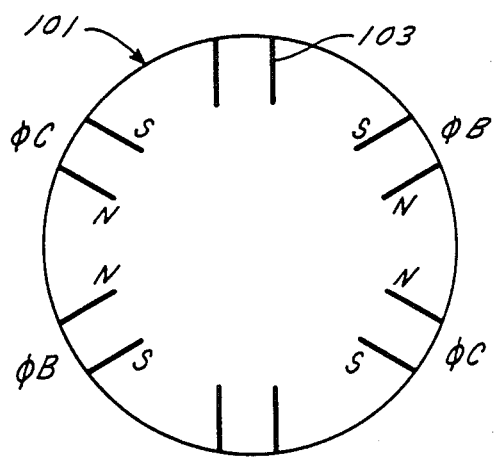
Figure 9C:
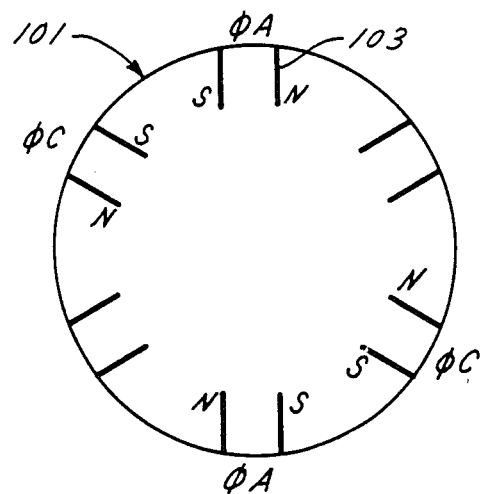

For motor constructions according to the invention having only one pair of stator poles per phase such as the motors illustrated in FIGS. 4a–4c and 5a–5c, simultaneous energization of two pole pairs may occur if more than one phase is applied to the windings at any one time. For example, FIGS. 6a–6c illustrate the motor construction of FIGS. 5a–5c energized by a "two-phase-on" scheme. The drive apparatus and the power waveforms it generates which provide the appropriate polarity to the pole pairs are illustrated in FIGS. 7b–7c, respectively. FIG. 7a illustrates the extra and undesired magnetic circuits created if the relative polarities of the stator poles are not in accordance with the preferred embodiment of the invention. FIGS. 8–10 are an illustrative embodiment of an ECR motor according to the invention where more than one pair of stator poles are energized per phase. As will become apparent from the following discussion, both of the motors illustrated in FIGS. 6a–6c and FIGS. 8–10 require control of the relative polarity of the stator pole pairs.

Turning first to the "two-phase-on" excitation scheme of FIGS. 6a–6c, the structure of the motor is identical to that illustrated in FIGS. 5a–5c and, therefore, the same identifiers will be used. In a "two-phase-on" excitation scheme, two phases are turned on simultaneously. As illustrated, the phase excitation sequence is AB, BC and CA, corresponding to FIGS. 6a, 6b and 6c, respectively. It will be appreciated that each of FIGS. 6a–6c is intended to illustrate an equilibrium position of the rotor for the purpose of explaining the magnetic circuits formed by excitation of the motor in accordance with the invention, and the illustrations are not intended to imply a step-like rotation of the motor.

Because the teeth 81 of the rotor 75 can only be simultaneously aligned with the stator poles 77 of one phase, the equilibrium positions of the rotor illustrated in FIGS. 6a–6c are such that none of the polarized rotor poles are radially aligned with the stator poles so as to be in a position of lowest reluctance. Other than the equilibrium position not corresponding to the low reluctance position, the operation of the motor of FIGS. 6a–6c as it relates to the generation of magnetic circuits is the same as that for the one-phase-on motors of FIGS. 4 and 5. For example, the bridge 89 of the magnetic circuits 79(A), 79(B) and 79(C) polarize the rotor teeth 81 in the flux path as a north/south pair in a similar manner in all three illustrated embodiments.

Referring first to FIG. 6a, with phases A and B energized, windings $A_1$, $A_2$, $B_1$ and $B_2$ are excited such that magnetic circuits 79(A) and 79(B) are simultaneously generated. In keeping with the invention, the flux paths of the magnetic circuits 79(A) and 79(B) include sections 83 of the back iron or yoke 85 of the stator 87 which are discrete sections relative to one another. In other words, the magnetic circuits 79(A) and 79(B) do not overlap one another in the back iron of the stator 87.

To ensure that the simultaneous energization of windings $A_1$, $A_2$, $B_1$ and $B_2$ form the separate magnetic circuits 79(A) and 79(B) illustrated in FIG. 6a, the neighboring stator poles 77($A_2$) and 77($B_1$) of different excited pairs must be of the same polarity. In other words, the circumferentially neighboring stator poles of the two energized pairs must be of the same polarity in order to prevent the creation of a magnetic circuit linking these poles of different pairs via the back iron of an unenergized pair. For example, if stator pole 77($A_2$) is a north pole and stator pole 77($B_1$) is a south pole in FIG. 6a, an undesired third magnetic circuit will be generated in addition to the magnetic circuits 79(A) and 79(B) illustrated in FIG. 6a. Furthermore, with the stator poles 77($A_2$) and 77($B_1$) having opposite also be of opposite polarities such that an undesired fourth magnetic circuit will be generated around the back iron area of stator poles 77($C_1$) and 77($C_2$) Such undesired and additional magnetic circuits are hereinafter called "secondary magnetic circuits" and are illustrated in FIG. 7a as dark solid lines 80(1) and 80(2) for the simultaneous energization of phases A and C. In accordance with the labeling of these magnetic circuits which link pairs of stator teeth as "secondary" magnetic circuits, the magnetic circuits between poles in a pair may be referred to as "primary" magnetic circuits.

In order to avoid creation of these secondary magnetic circuits 80(1) and 80(2) during the simultaneous energization of phases A and B in the illustrated motor of FIG. 6a, the stator poles 77($A_2$) and 77($B_1$) are energized by their windings $A_2$ and $B_1$, respectively, to have the same polarity. As illustrated, the stator poles 77($A_2$) and 77($B_1$) are south poles, but they could also be north poles. The important point is that they have the same polarity so that the undesired secondary magnetic circuits 80(1) and 80(2) are not created.

As a result of designating the stator poles 77($A_2$) and 77($B_1$) as south poles in the illustrated embodiment, the other stator poles 77($A_1$) in the phase A pair and stator pole 77($B_2$) in the phase B pair are energized as north poles. With the foregoing arrangement as illustrated, each stator pole in a pair has only one possible flux path to a pole of opposite polarity, and that path is to the other pole in the pair. Referring to stator pole 77($A_1$), for example, a counterclockwise path through the back iron or yoke 85 of the stator 87 will first arrive at the north pole of stator pole 77($B_2$). Because both stator poles 77($A_1$) and 77($B_2$) are of the same polarity, the secondary magnetic circuit 80(1) of FIG. 7a is not generated. In a clockwise direction through the back iron from stator pole 77($A_1$), the first magnetic pole reached is the south pole of the stator tooth 77($A_2$) in the phase A pair. Therefore, the path of flux through stator pole 77($A_1$) is only to the south pole of the phase A pair in accordance with the invention. The same relationships exist for the other stator poles 77($B_1$), 77($B_2$) and 77($A_2$).

From an examination of FIGS. 6a–6c, it can be seen that the pairs of rotor poles 81 polarized by a phase maintain the same type of relative polarity relationships as do the pairs of stator poles.

From the simultaneous energization of phases A and B, the drive mechanism for the motor sequences to a simultaneous energization of phases B and C as illustrated in FIG. 6b. Because the phase B windings $B_1$ and $B_2$ are already energized such that stator poles 77($B_1$) and 77($B_2$) are south and north poles, respectively, the stator poles 77($C_1$) and 77($C_2$) must be energized as north and south poles, respectively, in order to avoid the secondary magnetic circuits of the type illustrated in FIG. 7a.

Continuing to the next step in the two-phase-on energization sequence of the ECR motor of FIGS. 5 and 6, phases A and C are energized to provide the magnetic circuits of FIG. 6c. From the previous energization of phases B and C in FIG. 6b, phase C energizes windings $C_1$ and $C_2$ such that stator poles 77($C_1$) and 77($C_2$) are north and south poles, respectively. In order to ensure that the neighboring poles of the two excited phases A and C are of the same polarity, phase A (which was turned off during the previous sequence of BC) must be turned on so that the windings $A_1$ and $A_2$ create north and south poles at stator poles 77($A_2$) and 77($A_1$), respectively. By comparing the polarities of the phase A stator poles 77($A_1$) and 77($A_2$) in FIGS. 6a and 6c, it can be seen that the polarity has been reversed. If the polarity of the stator poles 77($A_1$) and 77($A_2$) is maintained the same in FIG. 6c, the secondary magnetic circuits of FIG. 7a will result.

To ensure neighboring pole teeth of different phases are always of the same polarity for the motor of FIGS. 6a-6c, a bipolar drive is provided as shown in FIGS. 7b-7c which alternates polarities of the energization pulses such that each phase alternates between positive and negative pulses. By providing such an energization scheme, phase A of the motor of FIGS. 6a-6c will reverse the polarity of the poles at the beginning of a new phase sequence, thereby giving the same polarity to the neighboring stator poles 77 ($C_2$) and 77 ($A_1$). Once phase A has reversed polarities, phases B and C must follow suit to ensure the two-phase-on steps of AB and BC provide for the proper relationships of stator pole polarity. The idealized current diagram for the three phases A, B and C used to energize the motor of FIG. 6a-6c in accordance with the invention is shown in FIG. 7c. It will be appreciated that a simple and conventional power semiconductor drive arrangement may be used to realize the waveforms of FIG. 7c.

As will be explained more fully in connection with FIG. 10, secondary magnetic circuits between adjacent pairs of energized poles such as magnetic circuit 80(2) in FIG. 7a may generally be considered to be in keeping with the preferred embodiment of the invention since the flux flow through these magnetic circuits is between adjacent stator poles, and the flux flow does not overlap the flux flow of any other magnetic circuits. Thus, there is no possibility of a flux reversal in the back iron and the switching frequency of the flux in the back iron is maintained at the commutation frequency. However, magnetic circuits such as magnetic circuit 80(1) in FIG. 7a overlaps other magnetic circuits in the motor, thereby increasing the switching frequency of the flux in at least a portion of the back iron area of the stator 87 and also giving rise to the possibility of flux reversals in the back iron. As it happens in FIGS. 6a-6c, a unipolar drive which generates the secondary magnetic circuits 80(1) and 80(2) would not cause flux reversals since magnetic circuit 80(2) does not overlap any other magnetic circuits and magnetic circuit 80(1) overlaps magnetic circuit 79(B) of phase B in regions where the flux flows of both circuits are in the same directions.

As for the flux switching frequency, however, it increases to twice the commutation frequency in the back iron area 85 which includes both the magnetic circuit 80(1) and the magnetic circuit 79(B). Therefore, when energized as a two-phase-on scheme by a unipolar drive, the motor of FIGS. 5 and 6 is still characterized by less eddy current loses than a conventional switched reluctance three-phase motor having six stator poles since the conventional motor has a flux switching frequency which is three times the commutation frequency. Also, since the unipolar drive for "two-phase-on" excitation of the motor of FIGS. 5-6 does not introduce flux reversals in the back iron 85, the hysteresis losses remain significantly less than the conventional construction. Accordingly, a unipolar, two-phase-on drive for the motor of FIGS. 5 and 6 would be more efficient than a conventional switched reluctance motor and, therefore, it is in keeping with the invention. Although not preferred, applicant believes there may be applications where the existence of secondary magnetic circuits which reduce efficiency of the ECR motor can be tolerated in order to take advantage of the simpler design of a unipolar drive instead of the bipolar drive needed for the current waveforms of FIG. 7c.

In some applications where torque ripple or noise level is an important consideration, motors having two or more stator pole pairs may be preferred over the one pair per phase construction shown in FIGS. 4–6. A three-phase motor incorporating the invention and having two pairs per phase is illustrated in FIGS. 8a–8c. With three phases and two pairs per phase, the stator 101 has a total of 12 stator poles 103. As in FIGS. 6a–6c, the polarity of each stator pole 103 associated with an energized winding is indicated in FIGS. 8a–8c by a label "N" for a north pole tip or "S" for a south pole tip.

FIGS. 8a–8c illustrate the low reluctance alignment of polarized pairs of adjacent stator and rotor poles 103 and 105, respectively, in response to the sequencial energization of the ECR motor by phases A (FIG. 8a), B (FIG. 8b) and C (FIG. 8c). As with the previous embodiments the poles of the rotor 107 are evenly spaced and the poles of the stator are alternately spaced by angles $\alpha_1$ and $\alpha_2$. The windings $A_1$-$A_4$, $B_1$-$B_4$ and $C_1$-$C_4$ are wrapped about the stator poles 103 such that adjacent poles separated by the larger angle $\alpha_2$ form adjacent pairs of opposite polarities in accordance with the invention. With the pairs of stator poles 103 defined by adjacent poles separated by the angle $\alpha_2$, the rotor 105 are also then separated by the angle $\alpha_2$ in order to provide for a low reluctance radial alignment of rotor and stator poles. As can be seen by the circuit diagrams associated with FIGS. 8a–8c, the windings of each phase A, B and C are preferably connected so that the two windings of each pair are in series and windings of each pair are in parallel with the windings of the other pair energized by the phase.

Upon energization of the ECR motor of FIGS. 8a–8c by phase A of a power source V+, adjacent pairs of stator poles 103 ($A_1$) 103 ($A_2$) and 103 ($A_3$), 103 ($A_4$) are energized so as to create magnetic circuits 109 ($A_1$, $A_2$) and 109 ($A_3$, $A_4$) whose flux flows between the poles of each pair by way of the back iron area 111 of the stator 101 bridging the adjacent poles in a pair and the adjacent pair of rotor teeth 105 which bridges the pole faces of the pair. Because of the uneven spacing of the stator poles 103, upon creation of magnetic circuits 109 ($B_1$, $B_2$) and 109 ($B_3$, $B_4$) by application of phase B to the windings $B_1$, $B_2$, $B_3$ and $B_4$ of the ECR motor (FIG. 8b), adjacent pairs of rotor poles 105 are drawn into low reluctance alignments with the pairs of stator poles 103, thereby imparting torque to the motor (FIG. 8b). In a similar manner, generation of magnetic circuits 109 ($C_1$, $C_2$) and 109 ($C_3$, $C_4$) by polarized stator poles 103 ($C_1$), ($C_2$), ($C_3$) and ($C_4$) draws pairs of adjacent rotor poles 105 into radial alignment so as to provide a low reluctance path between the pole faces of the pairs of stator poles (FIG. 8c).

In keeping with the preferred embodiment of the invention, the polarities of the two pairs per phase of the motor in FIGS. 8a–8c are determined so that the only possible flux path from a polarized stator pole 103 is through the other pole in the stator pair. To accomplish the foregoing in the two-pair per phase motor of FIGS. 8a–8c, the windings of a phase are energized so that a clockwise or counterclockwise path taken through the back iron from a selected one of the stator poles energized by a phase winding does not reach the opposite pole of the second pair without first passing either the opposite pole of the same pair or the same pole of the second pair. For example, in FIG. 8a phase A energizes windings $A_1$, $A_2$, $A_3$ and $A_4$ in a manner such that stator poles 103 ($A_1$) and 103 ($A_3$) are energized as south poles and stator poles 103 ($A_2$) and 103 ($A_4$) are energized as north poles. Referring to stator pole 103 ($A_1$), a path traced through the back iron from the pole in either a clockwise or counterclockwise direction will not provide a possible flux path to the north pole of stator pole 103 ($A_4$) As can be seen from FIG. 8a, the polarized poles 105 of the rotor 107 have a north/south positional relationship such that a flux path through the rotor connecting the two pairs is also not possible.

As previously mentioned in connection with the motor of FIGS. 6a–6c, the pattern of the polarization of pairs of rotor poles 105 drawn into alignment with a pair of stator poles maintains the same relationship as does the pattern of stator pole polarities.

Referring to FIG. 8b, the energization of windings $B_1$, $B_2$, $B_3$ and $B_4$ by phase B polarizes stator poles 103 ($B_1$), ($B_2$), ($B_3$) and ($B_4$) in a manner which provides the same positional polarity relationship as illustrated in FIG. 8a. As for FIG. 8c, phase C energizes windings $C_1$, $C_2$, $C_3$ and $C_4$ so as to polarize stator poles 103 ($C_1$), ($C_2$), ($C_3$) and ($C_4$) in a similar relative positional relationship as the stator pole pairs energized by phases A and B.

Although the stator poles are polarized in the illustrated embodiment of FIGS. 8a–8c such that the north pole in a pair is located in a counterclockwise direction relative to the south pole, this relationship can be reversed for any of the phases so long as no possible alternative or "secondary" magnetic circuit is created between the two energized pole pairs. For example, the energization pulse for phase C may be reversed from that shown in FIG. 8c, thereby reversing the current flow through the windings $C_1$, $C_2$, $C_3$ and $C_4$. Such a reversal of current will reverse the polarities of the stator poles 103 ($C_1$), ($C_2$), ($C_3$) and ($C_4$). Such a reversal of polarities, however, merely creates a mirror image of the positional relationship illustrated in FIG. 8c. Therefore, reversal of the phase current does not effect the relative positioning of the poles in a manner which creates a possible secondary magnetic circuit.

To visualize the secondary magnetic circuits which may be generated by the inappropriate designation of polarities of the two pole pairs energized by each phase, FIG. 8d illustrates the energization of windings $C_1$, $C_2$, $C_3$ and $C_4$ by phase C in a manner which provides a possible flux path through the back iron from a stator pole 103 of one polarity to a stator pole of the opposite polarity in the other pole pair. As can be seen, the alternative paths for the flux emanating from the energized stator poles 103 ($C_1$), ($C_2$), ($C_3$) and ($C_4$) develop two secondary magnetic circuits 113 and 115 which travel about the back iron areas 117 and 119 of phases A and B, respectively. The primary magnetic circuits 109 ($C_1$, $C_2$) and 109 ($C_3$, $C_4$) are also present. Unlike the secondary magnetic circuits created by a unipolar drive for a two-phase-on energization of the motor of FIGS. 5 and 6, the secondary circuits generated by an incorrect relationship of polarities between pairs of stator-poles in the ECR motor of FIGS. 8a–8d result in a flux switching frequency and a flux reversal frequency which are equal to those same frequencies in a conventional switched reluctance motor having twelve stator poles. Therefore, the presence of secondary magnetic circuits for a one-phase-on excitation of the ECR motor of FIGS. 10a–10d are not in keeping with the invention.

Using computer-generated models, applicant has compared the performance characteristics of the three-phase ECR motor of FIGS. 8a–8c and a switched reluctance three-phase motor of conventional design, having twelve stator poles—i.e., the same number of stator poles as the ECR motor. Except for the asymmetrical spacing of the stator poles on the ECR motor, the stator stack for both motors were selected to have the same dimensions. The rotor of the ECR motor has ten evenly spaced poles as illustrated in FIGS. 8a–8c, and the conventional switched reluctance motor has eight evenly spaced rotor poles. In the conventional motor, each phase. energizes two pairs of diametrically opposing poles. Each pair of diametrically opposing stator poles create magnetic circuits similar to that illustrated for phases A or B in FIG. 1. The ECR motors were modeled to be excited as shown in FIGS. 8a–8c. In simulated operation, both motors were energized using a one-phase-on scheme where only one phase was on at any given time.

The computer program used to simulate operation of the ECR and conventional motors is entitled PC-SRD by Professor T. Miller et al. of the University of Glasgow, Scotland. In the United States, the program is commercially available from Infolytika of Montreal, Canada. The program provides a performance analysis of motor designs. As part of that analysis, core and copper losses are approximated. The core losses are divided into two types—eddy current losses and hysteresis losses. Three sizes of motors were modeled using the PC-SRD program. For each size, motor performance was analyzed for conventional and ECR configurations. To ensure a fair comparison between the two configurations, the two motors were modeled exactly the same except for essential structural and operational features of the invention—i.e., the ECR motor modeled by the program had unevenly spaced stator poles and adjacent poles excited by each phase so as to have opposite polarities in the manner shown in FIGS. 8a–8c. Because the ECR motors are modeled to be the same as a conventional motor of the same size in as many ways as possible, it will be appreciated that optimum performance is not reflected by the performance data set forth in the following tables.

Figure 11:
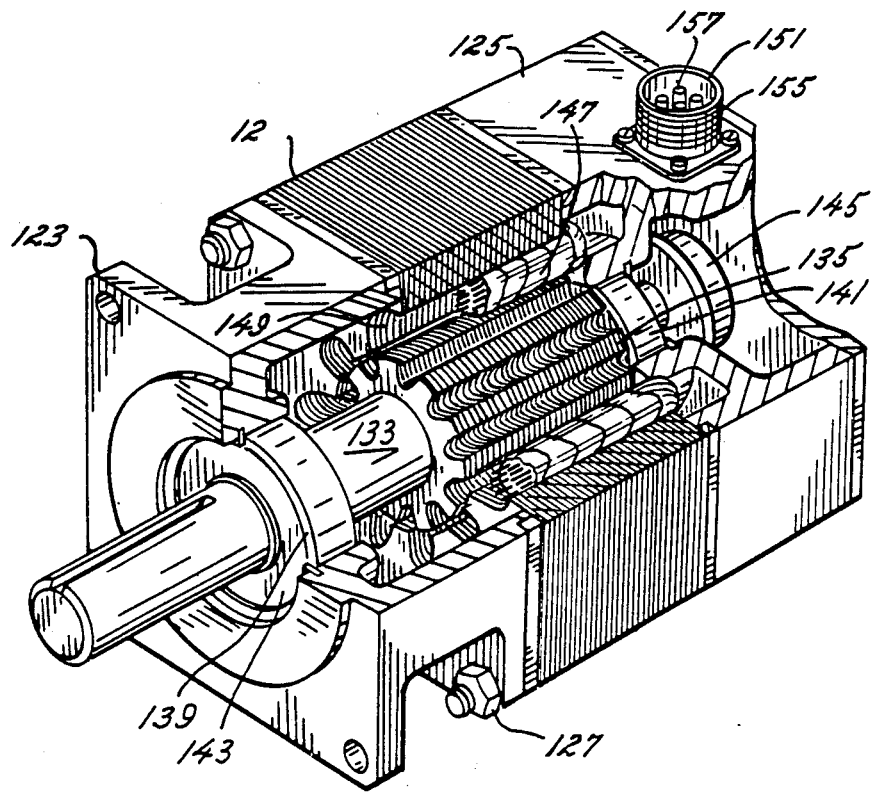
FIG. 11 is a perspective view of an assembly for a three-phase ECR motor incorporating the invention in accordance with a preferred embodiment, with part of the stator laminations cut away to expose the rotor.
Figure 12:
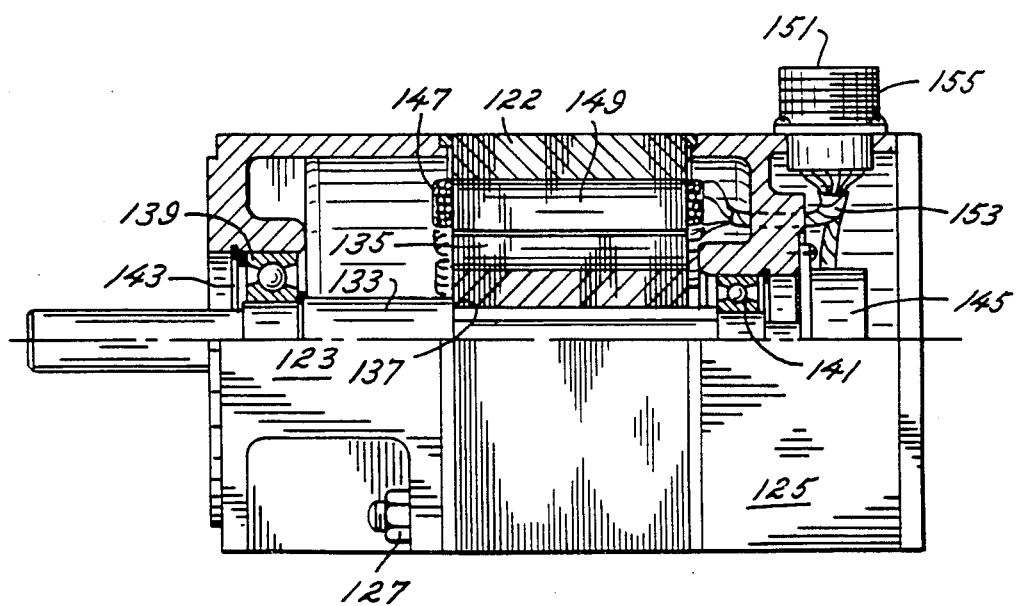
FIG. 12 is a cross-sectional view of the ECR motor assembly of FIG. 11 taken along the line 12—12 in FIG. 11.

For each motor size, the construction was programmed to be essentially that shown in FIGS. 11 and 12. For example, the stator and rotor were stacks of laminations made of non-oriented silicon steel (i.e., M15). For each motor size, performance data was obtained at three speeds. The speeds represent a large operating range and were chosen to illustrate that the ECR motor exhibits improved efficiency at all speeds relative to a conventional switched reluctance motor, but especially at high speeds. For each motor size, the losses and output power in watts at 25° C. are set forth in the following TABLES II–IV.

In TABLE II, the motor has a 2.25 inch outer diameter for the stator and a rotor and stator stack length of four inches. A 160 volt DC bus was used as the power source for three-phase energization. In TABLE III, the motor has a 4¼ inch outer diameter for the stator and a rotor and stator stack length of six inches. A 300 volt DC bus was used in connection with the three-phase power source. Finally, in TABLE IV, the motor has a stator outer diameter of 18 inches, and a stator and rotor stack length of 11 inches. A power bus of 650 volts DC was used to implement the three-phase drive.

Optimum performance at each speed was found by advancing the commutation angle one degree at a time until the performance data provided by the program indicated the best performance level. For each speed, the commutation angle is expressed as a percentage advance relative to the nominal or "dead center" commutation angle. Motor efficiency was calculated by dividing motor output by the sum of the output and the total losses.

energization of phases AB, BC and CA, respectively. By comparing the polarity of the stator poles 103 of phase A in FIGS. 9a and 9c, it can be seen that a two-phase-on scheme is implemented for the motor of FIGS. 8a-8c in the same manner shown in FIG. 7c for the motor of FIGS. 6a-6c. It should be noted, however, that the windings of each phase in FIGS. 9a-9c are connected to provide a polarity relationship different from the relationship of the phase pairs shown in FIGS. 8a-8c. The polarity relationship of the stator poles of the two pairs in a phase are such that they form an alternating pattern of north and south poles in FIGS.

TABLE II

| | 2¼ INCH MOTOR | | | | | |
|---|---|---|---|---|---|---|
| | 1000 RPM (0% ADVANCE) | | 6000 RPM (12% ADVANCE) | | 10,000 RPMs (22% ADVANCE) | |
| | CONVENTIONAL | ECR | CONVENTIONAL | ECR | CONVENTIONAL | ECR |
| Losses (W) at 25°C. | | | | | | |
| A. Copper | 67.6 | 67.6 | 35.2 | 35.2 | 26.44 | 26.44 |
| B. Eddy Current | 14.5 | 10.2 | 118.2 | 58.9 | 169.1 | 129.4 |
| C. Hysteresis | 7.5 | 3.2 | 28.4 | 11.5 | 24.9 | 9.46 |
| Total Losses (W) | 89.6 | 81.0 | 180.8 | 105.6 | 220.4 | 165.3 |
| Outpower (W) | 113 | 121.6 | 324 | 399.2 | 362 | 417 |
| Efficiency (%) | 55.8 | 60 | 64 | 79 | 62.2 | 71.6 |

TABLE III

| | 4¼ INCH MOTOR | | | | | |
|---|---|---|---|---|---|---|
| | 1000 RPM (0% ADVANCE) | | 6000 RPM (11% ADVANCE) | | 12,000 RPMs (33% ADVANCE) | |
| | CONVENTIONAL | ECR | CONVENTIONAL | ECR | CONVENTIONAL | ECR |
| Losses (W) at 25°C. | | | | | | |
| A. Copper | 94.4 | 94.4 | 40 | 40 | 47.3 | 47.3 |
| B. Eddy Current | 39.8 | 29.7 | 235 | 175 | 303 | 225.9 |
| C. Hysteresis | 28.3 | 11.3 | 65 | 24 | 69.8 | 25.4 |
| Total Losses (W) | 162.5 | 135.4 | 340 | 239 | 420 | 298.6 |
| Outpower (W) | 460 | 487.1 | 949 | 1050 | 1246 | 1367 |
| Efficiency (%) | 73.9 | 78.2 | 73.6 | 81.4 | 74.8 | 82 |

TABLE IV

| | 18 INCH MOTOR | | | | | |
|---|---|---|---|---|---|---|
| | 750 RPM (0% ADVANCE) | | 6000 RPM (20% ADVANCE) | | 20,000 RPMs (55% ADVANCE) | |
| | CONVENTIONAL | ECR | CONVENTIONAL | ECR | CONVENTIONAL | ECR |
| Losses (W) at 25°C. | | | | | | |
| A. Copper | 1305 | 1305 | 237 | 237 | 113 | 113 |
| B. Eddy Current | 1367 | 742 | 7447 | 4041 | 11288 | 6147 |
| C. Hysteresis | 1206 | 354 | 1743 | 506 | 1873 | 545 |
| Total Losses (W) | 3878 | 2401 | 9427 | 4784 | 13274 | 6805 |
| Outpower (W) | 24,000 | 25,900 | 33,000 | 37,500 | 20,200 | 26,600 |
| Efficiency (%) | 86.3 | 91,5 | 77.3 | 88.7 | 60.3 | 79.6 |

From Tables II through IV, it can be seen that the ECR motor offers increased efficiency relative to a similar 12-pole, three-phase switched reluctance motor constructed and excited in accordance with the conventional approach exemplified by FIG. 1. The ECR motor is more efficient at all operating speeds, but its greatest efficiency advantage is at the highest speeds of the motor. Moreover, this performance improvement is achieved without added manufacturing expense since the simplicity of the design of an ECR matches that of conventional switched reluctance motors.

Returning to the illustrated embodiments of an ECR motor, the 12-pole ECR motor of FIGS. 8a-8d may be energized by a two-phase-on scheme or a hybrid of one-phase-on and two-phase-on schemes where the on-time of each phase partly overlaps the on-time of another phase. For the former drive scheme, FIGS. 9a-9c show in schematic form the polarities assigned to the stator poles 103 by all of the windings $A_1$, $A_2$, $B_1$, $B_2$, $C_1$ and $C_2$ FIGS. 9a-9c illustrate the simultaneous 9a-9c when considered circumferentially. In contrast to this pattern, the poles formed by a phase in FIGS. 8a-8c form a circumferential pattern of two of one polarity followed by two of the other polarity. As illustrated by FIG. 8d, if the polarity pattern for a one-phase-on drive scheme is north/south/north/south, etc., secondary magnetic circuits are formed through the back iron areas of the unenergized phases.

For the particular ECR motor construction of FIGS. 8-9, the secondary magnetic circuits generated by a two-phase-on scheme using a unipolar drive occur only once every cycle of the phases A, B and C. In other words, the back iron of the stator experiences a flux switching frequency of twice the commutation frequency, which is still approximately 33% better than a conventional switched reluctance motor. Moreover, the secondary magnetic circuits do not introduce flux reversals, so the hysteresis losses should be substantially unaffected. Therefore, a unipolar drive may be used to realize a two-phase-on energization scheme without departing from the spirit of the invention; however, such a drive is believed to be less desirable than a bipolar drive which eliminates the secondary magnetic circuits.

From the foregoing, it can be appreciated that the polarity pattern for a two-phase-on drive scheme results in secondary magnetic circuits if used for a one-phase-on drive scheme. For a hybrid drive scheme where phases overlap in time as shown by the idealized current waveforms in FIG. 10a, neither the polarity relationships of FIGS. 8 or 9 are entirely appropriate. In a hybrid drive scheme, the stator pole pairs of a phase are energized by themselves for a large portion of a phase's on time. Therefore, the polarities of the poles of each phase must be arranged in accordance with a one-phase-on drive scheme in order to prevent any possible secondary magnetic circuit developing through the back iron area of the stator 103 of an unenergized phase. Accordingly, the stator pole pairs of each phase must have a circumferential pattern of polarity of two of one polarity followed by two of the other as illustrated in FIGS. 8a–8c. To make such a pattern also work for the times two phases are on in a hybrid drive, the pattern of the polarity for each phase is reversed relative to the previous phase as illustrated in FIGS. 10b–d. Specifically, the polarities for adjacent pairs define a circumferential pattern of alternating north and south poles. As with the polarities of all the previous excitation schemes, this pattern of polarities provides no possible flux reversals in the back iron and, specifically, prevents the creation of magnetic circuit through the back iron area of an unenergized phase. In this connection, the neighboring pairs of stator poles separated by unpolarized stator poles have their polarities arranged so that adjacent poles of the different pairs are of the same polarity. For the illustrated three-phase drive, such a relationship requires a drive of alternating polarity as suggested by the idealized current diagram of FIG. 10a.

Figure 10A:
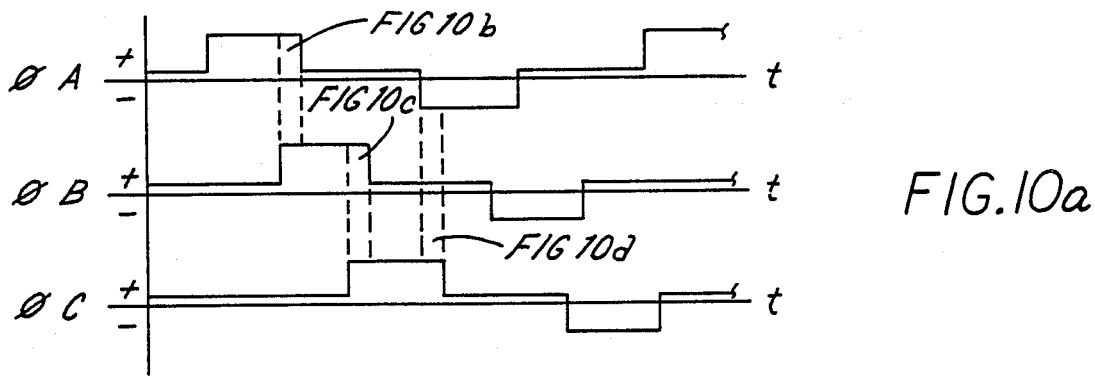
FIG. 10a is a schematic and idealized diagram of the current waveforms an energization scheme of a three-phase ECR motor according to the invention, where the energization scheme is a hybrid of one-phase-on and two-phase-on schemes.
Figure 10B:
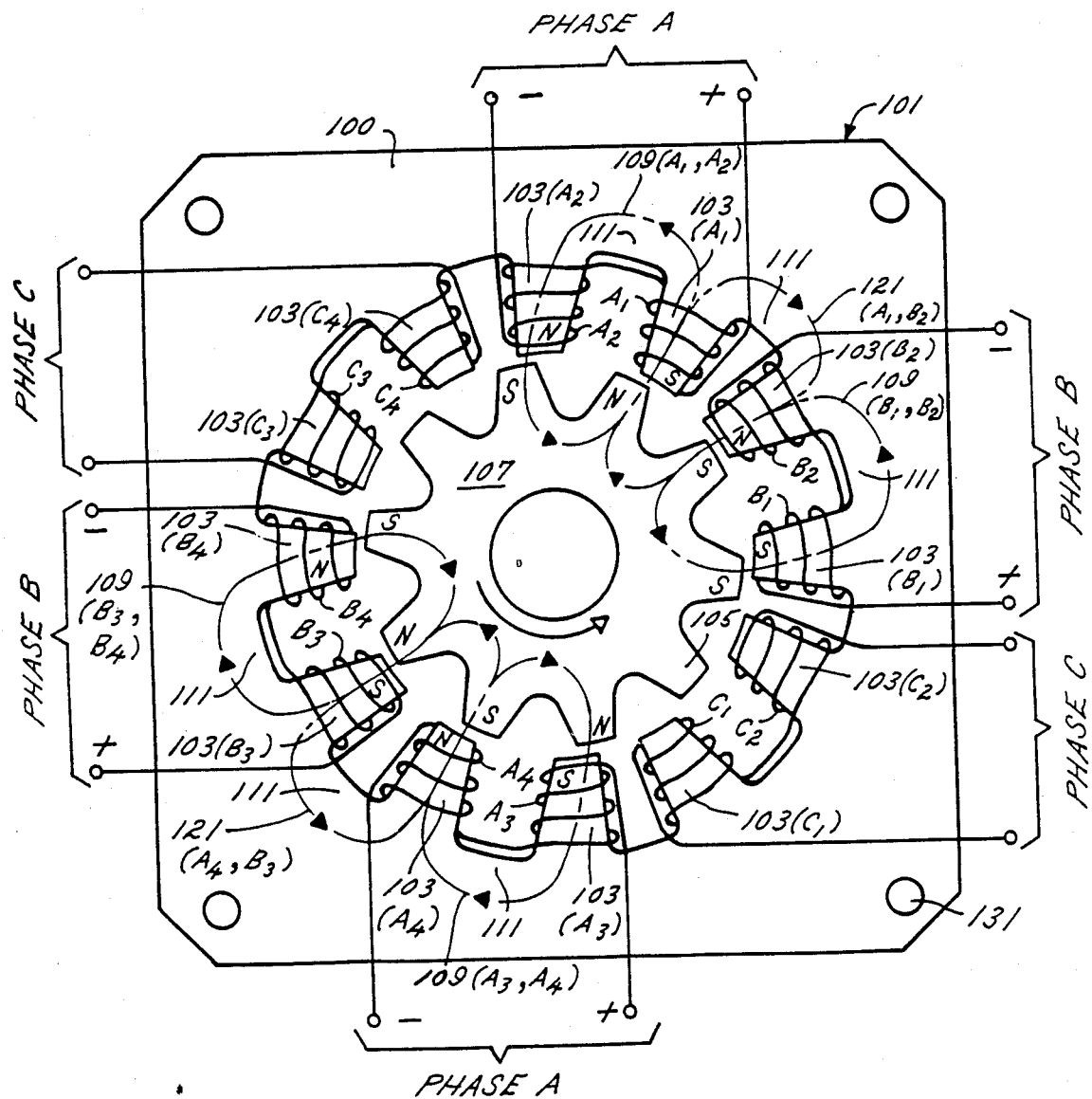
Figure 10C:
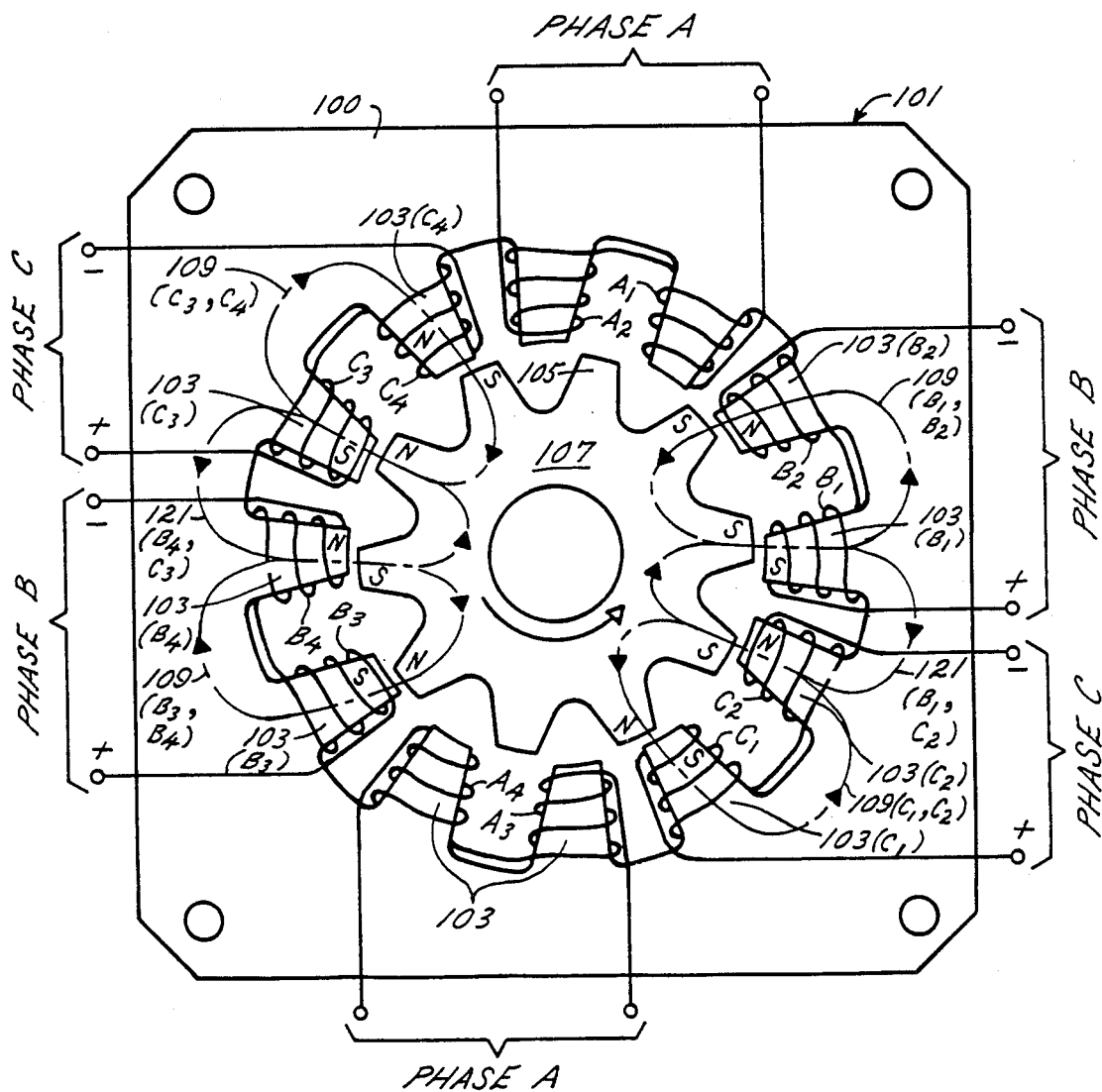
FIG. 10c is the same cross-sectional view of the ECR motor shown in FIGS. 8a-8d, except the motor is shown as energized by a hybrid drive scheme during the time both phases B and C are on as indicated by FIG. 10b.
Figure 10D:
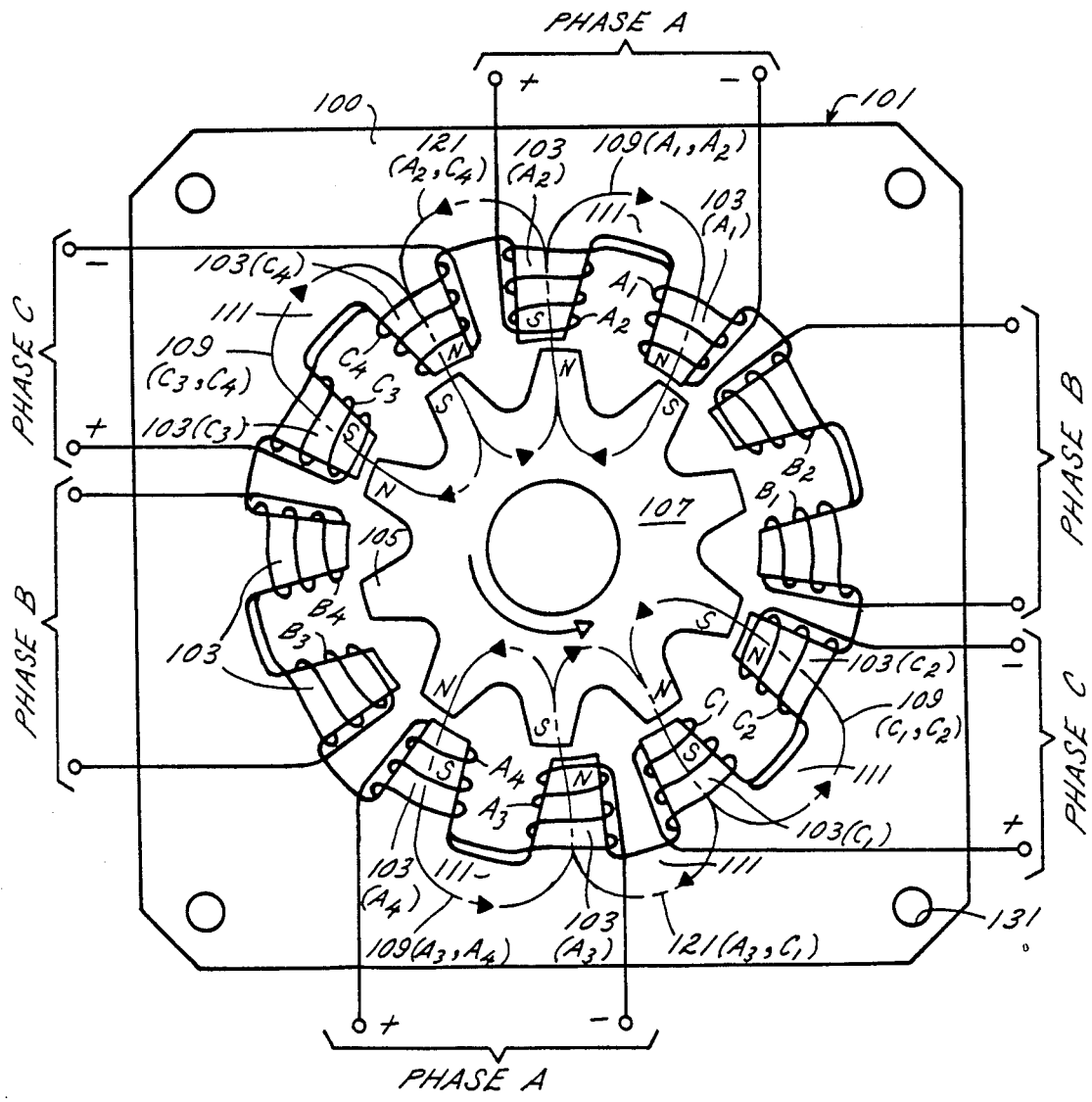
Figure 10:
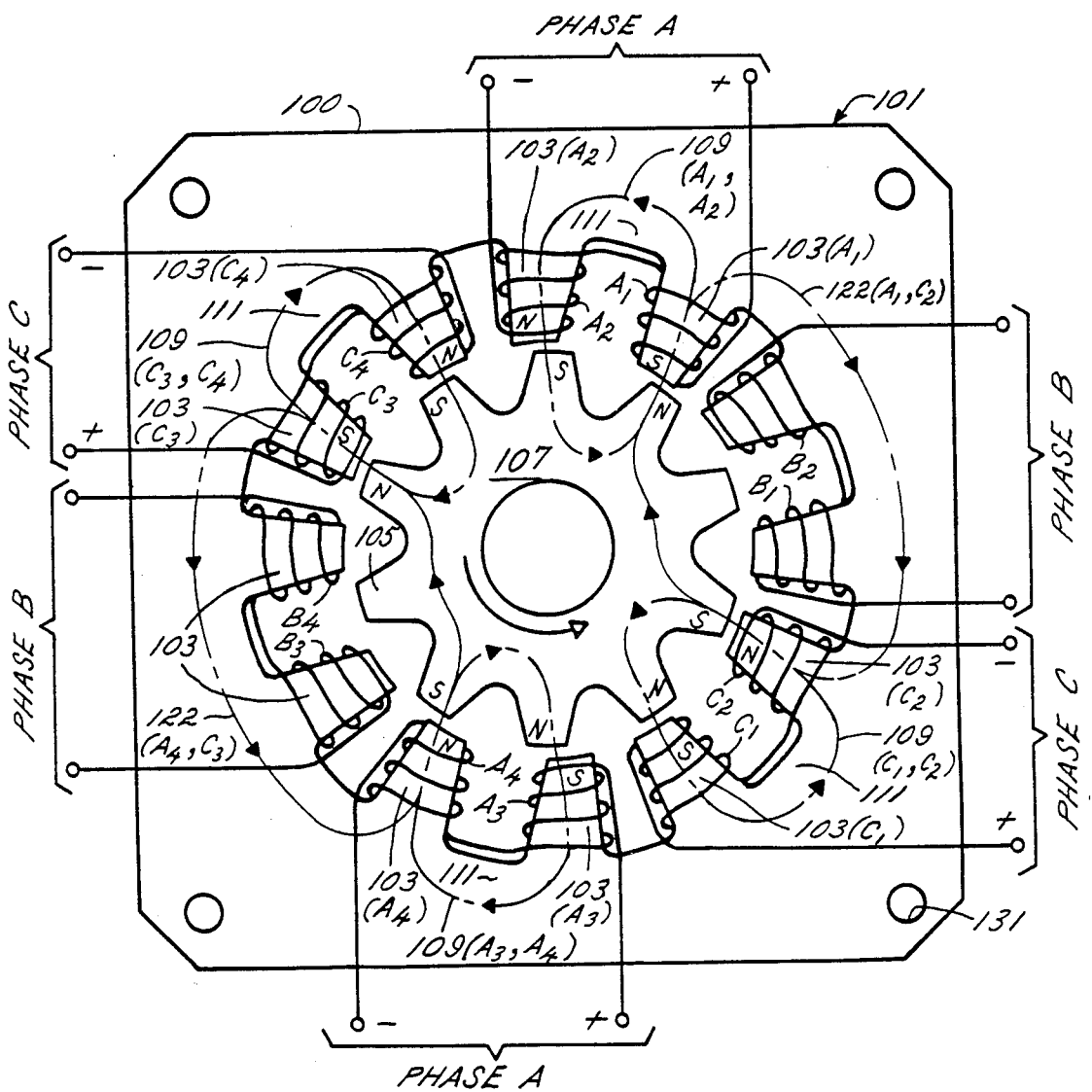

When the ECR motor of FIGS. 8–10 is energized in accordance with the current waveforms of FIG. 10a, three magnetic circuits are generated by two adjacent pairs of poles during the times that two phases are on. FIGS. 10b–d are intended to illustrate the times of overlapping phases AB, BC and CA, respectively. In accordance with the invention, each pair of stator poles 103 comprises two poles of opposite polarities so as to create a magnetic circuit 109 between the poles of a pair. Because two adjacent pairs of stator poles define a circumferential pattern of alternating polarities, there is a third magnetic circuit 121 between neighboring poles of the adjacent pairs. Such a third magnetic circuit bridging adjacent pairs is within the spirit of the invention since the circuit provides a flux path through an area of the back iron of the stator that is not incorporated as part of any other magnetic circuit; therefore, the flux switching frequency remains equal to the commutation frequency for all areas of the back iron and no flux reversals occur in the back iron as a result of this third and "secondary" magnetic circuit.

Turning first to the overlapping on-time of phases A and B illustrated in FIG. 10b, energized windings $A_1$–$A_4$ polarize stator poles 103 ($A_1$)–103 ($A_4$) so as to provide a polarity pattern which is the same as for the one-phase-on scheme of FIGS. 8a–8c. Windings $B_1$–$B_4$ are energized by phase B to have the same one-phase-on pattern. Phases A and B generate primary magnetic circuits 109 ($A_1$, $A_2$), 109 ($A_3$, $A_4$), 109 ($B_1$, $B_2$) and 109 ($B_3$, $B_4$). Because of the alternating polarity pattern formed by the adjacent stator pole pairs energized by phases A and B, secondary magnetic circuits 121 ($A_1$, $B_2$) and 121 ($A_4$, $B_3$) are also generated. In order to avoid secondary magnetic circuits through the back iron area 100 of the unenergized windings $C_1$–$C_4$ of phase C, the neighboring poles of the two energized pairs separated by each of the unenergized phase C pairs are of the same polarity. Specifically, neighboring poles 103 ($B_1$) and 103 ($A_3$) separated by unenergized stator poles 103 ($C_1$) and 103 ($C_2$) are north poles, and neighboring poles 103 ($B_4$) and 103 ($A_2$) separated by unenergized stator poles 103 ($C_3$) and 103 ($C_4$) are also north poles.

Referring to the simultaneous energization of phases B and C in FIG. 10c, the same relationships are maintained as recited in connection with the simultaneous energization of phases A and B in FIG. 10b. Specifically, primary magnetic circuits 109 ($B_1$, $B_2$), 109 ($C_1$, $C_2$), 109 ($B_3$, $B_4$) and 109 ($C_3$, $C_4$) are formed in accordance with the invention. Joining the adjacent pairs of phases B and C are secondary magnetic circuits 121 ($B_1$, $C_2$) and 121 ($B_4$, $C_3$).

By reversing the polarity of the energy applied by phase A in FIG. 10d, the simultaneous excitation of phases C and A maintains the magnetic circuit pattern of phases AB and BC in FIGS. 10b and 10c, respectively. Without reversing polarity of phase A relative to the polarity of the phase in FIG. 10b, the magnetic field pattern of FIG. 10e is created. Referring to the illustration of FIG. 10e, excitation of the motor of FIGS. 8–10 by a hybrid drive scheme wherein the poles of the stator are maintained unipolar results in one secondary magnetic circuit per sequence of phase excitation which overlaps in a back iron area the flux path of another magnetic circuit. The overlapping flux flows are in opposite directions and a flux reversal occurs. In FIG. 10e, the secondary magnetic circuits which cause flux reversals in the back iron 100 of the stator 101 are magnetic circuits 122 ($A_1$, $C_2$) and 122 ($A_4$, $C_3$). Using a bipolar drive, however, these secondary magnetic circuits 122 ($A_1$, $C_2$) and 122 ($A_4$, $C_3$) are eliminated and secondary magnetic circuits 121 ($A_2$, $C_4$) and 121 ($A_3$, $C_1$) are created as shown in FIG. 10d. As with similar secondary magnetic circuits between adjacent energized stator pole pairs created by the simultaneous application of phases A and B or B and C in FIGS. 10b and 10c, respectively, secondary magnetic circuits 121 ($A_2$, $C_4$) and 121 ($A_3$, $C_1$) do not increase the flux switching frequency in the back iron or cause flux reversals and are therefore in keeping with the invention.

If a unipolar drive is used to provide a hybrid drive scheme for the motor of FIGS. 8–10, some improved efficiency still results. Most of the back iron 100 of the stator 101 still experiences a flux switching frequency equal to the commutation frequency. A portion of the back iron 100 (the area associated with the stator pole pairs of phase B) experiences a flux switching frequency equal to twice the commutation frequency. Also, the flux reversals occur over only a limited area of the back iron 100 and occur at a frequency equal to the commutation frequency. Although a unipolar drive to implement a hybrid scheme is certainly not as desirable as a bipolar drive, an ECR excited by such a drive nevertheless offers performance improvements relative to conventional switched reluctance motors and may have uses in particular applications. For example, hybrid drive reduces torque ripple and may be the drive of choice for applications of the ECR motor requiring a servomotor function. For low speed servomotors, the losses introduced by the secondary magnetic circuits of a unipolar drive are believed to be insignificant in comparison to the advantage of utilizing a unipolar drive instead of a more expensive bipolar drive. For higher speeds, however, the losses from the secondary magnetic circuits in a hybrid drive scheme are more substantial, and the extra expense of a bipolar drive may be justified.

To form an exemplary motor according to the invention, the stator and rotor laminations are stacked to a length which gives the desired power rating. The laminations are composed of a magnetically permeable steel alloy such as nonoriented silicon steel (e.g., M15 or M19). A lamination construction is preferred because it significantly reduces eddy current losses. Such a construction is shown in FIGS. 11 and 12 where the stator stack 122 is sandwiched between opposing motor end bells 123 and 125 and held together as a unitary structure by bolts 127 which pass through bores in the stator stack 122 formed by the alignment of the holes 131 (see FIGS. 4–6 and 8–10) in each lamination. Although the illustrated motor has a box-like shape, other shapes such as cylindrical are also possible.

Except for the arrangement of stator pole pairs for each phase, the illustrated construction of a motor incorporating the invention is conventional. A shaft 133 provides a mounting for the rotor laminations. The shaft 133 and stack of rotor laminations 135 are keyed in order that the laminations may be longitudinally aligned. To hold the rotor stack 135 together, one end of the stack is biased against an edge 137 formed by a transition in the diameter of the shaft 133. The second end of the rotor stack 135 is held in place by a conventional clamping mechanism (not shown).

Inside the motor end bells 123 and 125, bearings 139 and 141 support the rotor shaft 133 for rotation. At one end, the shaft 133 extends past the bearing 139 and through an annular plate 143 in order to provide a drive output. A conventional position sensor 145 is coupled to the other end of the shaft 133. The position sensor 145 provides information regarding position of the rotor stack 135 to the electronic drive (not shown) in order for the drive to control commutation.

In a conventional manner for switched reluctance motors, the windings 147 are wound about the stator pole teeth 149. For delivering power to the windings, a receptacle 151 is provided on one side of the motor end bell 125. The receptacle 151 couples a polyphase drive source (not shown) to the windings 147. Cabling 153 inside the motor end bell 125 physically and electrically joins the receptacle 151 to the windings 147 and the sensor 145. It will be appreciated by those skilled in the motor art that the windings for switched reluctance motors are the simplest of all motor types, thereby providing a substantial manufacturing cost advantage relative to other motor types. In addition to providing an input port for a polyphase source, the receptacle 151 also serves as an output port for signals from the position sensor 145. In the illustrated embodiment, the receptacle 151 includes externally threaded skirts 155 for mating with a matched receptacle (not shown). Recessed inside the cylindrical skirt 155 of the receptacle 151 are a plurality of contact prongs 157 which plug into the mating receptacle.

The foregoing discussion regarding the structure of a motor according to the invention and its various modes of excitation are all related to a rotary machine with the rotor inside the stator. Those skilled in the art of motor design will appreciate that the inventive concepts of the invention may be applied to other motor types such as "inverted" (i.e., stator inside the rotor) and linear motors. Exemplary inverted and linear motors incorporating the invention are illustrated in FIGS. 13 and 14, respectively.

Figure 13A:
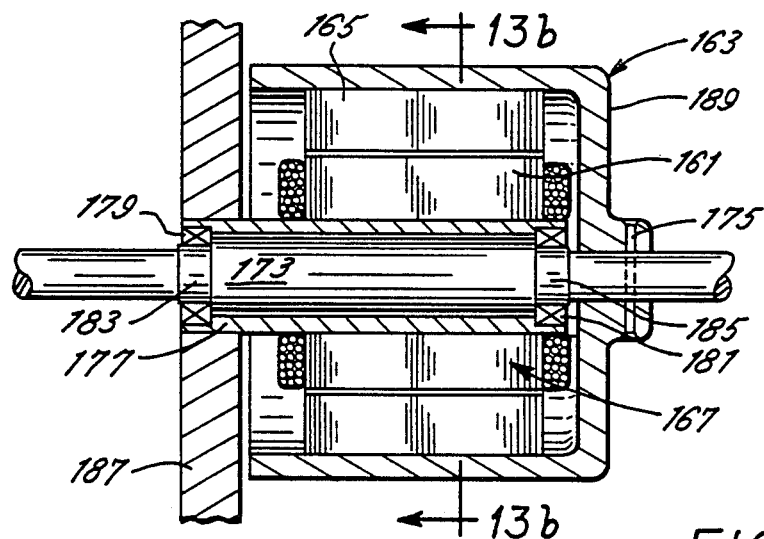
FIG. 13a is a cross-sectional view of an exemplary "inverted" ECR motor taken along the length of the motor, incorporating the invention according to a fourth embodiment.
Figure 13B:
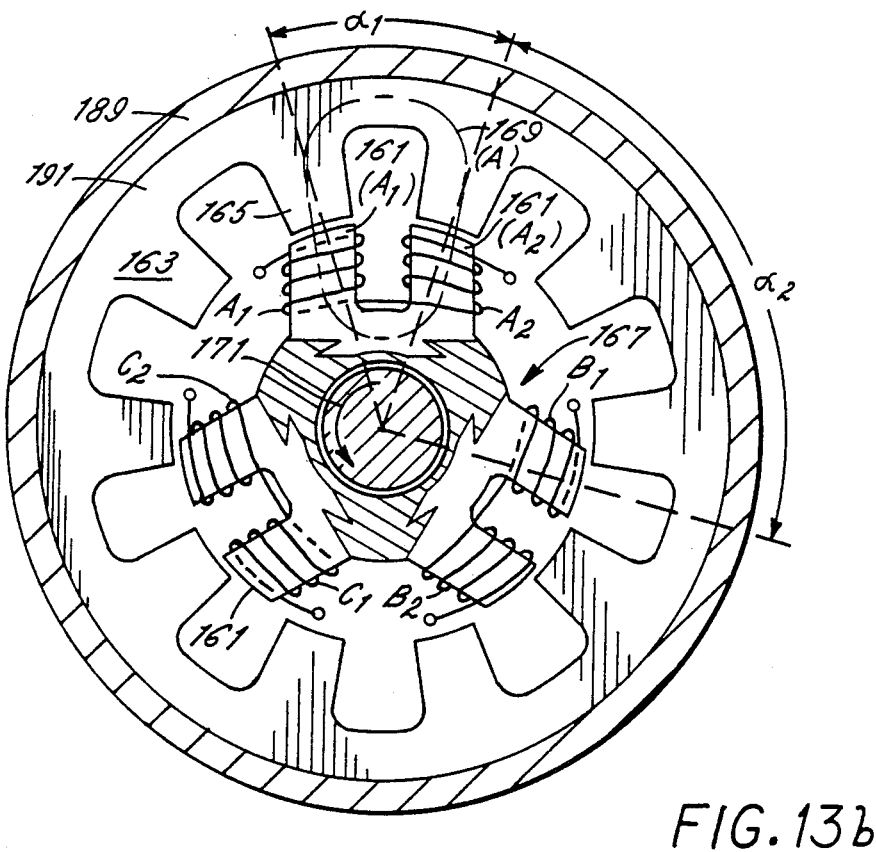
FIG. 13b a cross-sectional view of the "inverted" motor of FIG. 13a, taken along the line 13b—13b and effectively showing the configurations of a stator and rotor, laminations according to the invention.

A simple three-phase inverted motor is illustrated in FIGS. 13a and 13b where one pair of stator poles 161 is excited by each of the phases A, B and C. As is conventional in inverted motors, a rotor 163 is mounted for rotation about a stator 167. In keeping with the invention, the poles 165 of the rotor 163 are separated by equal angles of $\alpha_1$ degrees, and the poles 161 of the stator 167 are circumferentially separated by alternating angles of $\alpha_1$ and $\alpha_2$ degrees. Energization of the windings of each pair of stator poles generates a magnetic circuit such as the magnetic circuit 169(A) in FIG. 13b. Specifically, energization of phase A windings $A_1$ and $A_2$ draws stator, poles 161 ($A_1$) and 161 ($A_2$) into a low reluctance alignment with adjacent pairs of rotor poles 165. The same low reluctance alignment occurs between adjacent rotor poles and the stator pole pairs associated with the windings $B_1$, $B_2$ and $C_1$, $C_2$ of phases B and C, respectively. Sequential application of phases A, B and C to the inverted motor rotates the rotor 163 in a counterclockwise direction as indicated by the arrow 171 in FIG. 13b.

In the illustrated embodiment of an inverted motor of FIG. 13a, the rotor 163 is keyed to a drive shaft 175 by a pin 175. The drive shaft 173 is mounted for rotation inside a hollow cylinder 177 by bearings 179 and 181 receiving journals 183 and 185, respectively. The outer surface of the hollow cylinder 177 provides a support surface for the stator 167. A reference surface 187 provides a base to which the hollow cylinder 177 is secured. As with the other illustrated motors, the rotor 163 and stator 167 are preferably formed by a plurality of laminations. The outer perimeter of the rotor 163 is a casing 189 for supporting the rotor laminations 191.

Figure 14:
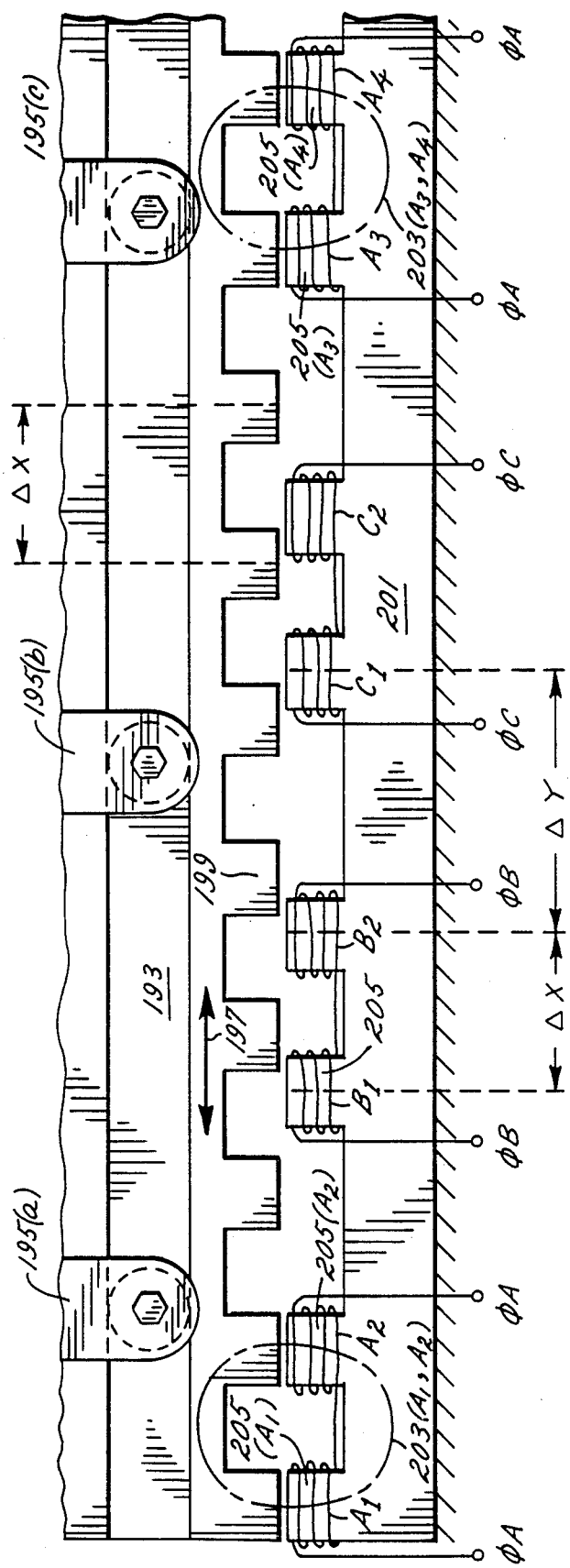
FIG. 14 an illustration of an exemplary linear ECR motor incorporating the invention according to a fifth embodiment.

For a linear motor incorporating the invention, FIG. 14 illustrates a rack 193 mounted to roller assemblies 195(a), 195(b) and 195(c) for bi-directional movement as indicated by arrow 197. In keeping with the invention, the rack 193 includes evenly spaced teeth 199 separated by a distance $\Delta X$, and a stator 201 includes unevenly spaced poles separated by alternating distances of $\Delta X$ and $\Delta Y$. As with the relationship between angles $\alpha_1$ and $\alpha_2$ in the illustrated rotary motors, $\Delta X$ and $\Delta Y$ are unequal and are not integer multiples of one another. In the illustrated embodiment $\Delta Y$ is 5/3 of $\Delta X$. Furthermore, pairs of adjacent stator poles may be the stator poles separated by the distance $\Delta X$ as shown in the illustrated embodiment or stator poles separated by $\Delta Y$. If the latter separation is chosen, the separation between poles 199 of the rack 193 must also be $\Delta Y$ in order to provide for low reluctance alignment.

As with the other three-phase embodiments of the invention illustrated herein, the linear motor of FIG. 14 may be energized by a one-phase-on, two-phase-on or hybrid scheme. A one-phase-on scheme is illustrated in FIG. 14 with phase A energizing windings $A_1$, $A_2$, $A_3$ and $A_4$. As the illustration indicates, the stator 201 and rack 193 may be made as long as necessary for the application. Therefore, more than the four windings $A_1$, $A_2$, $A_3$ and $A_4$ may be energized by phase A. With phase A energized, magnetic circuits 203 ($A_1$, $A_2$) and 203 ($A_3$, $A_4$) are formed between the adjacent stator poles 205 ($A_1$), 205 ($A_2$) and 205 ($A_3$), 205 ($A_4$), respectively. Adjacent pairs of poles 199 on the rack 193 are drawn into a low reluctance alignment with the energized pairs of stator poles 205, thereby causing linear movement of the rack. By choosing different sequences of phase excitation of the windings, the direction of movement by the rack 193 may be controlled.

Various embodiments of motors incorporating the invention have been illustrated herein. From an understanding of the illustrated embodiments, other variations will be apparent to those skilled in motor design. The important principle of all the various designs is the provision of pairs of adjacent poles having opposing polarities each energized by the same phase of a power source so as to form a magnetic circuit between the poles of the pair. By providing uneven spacing between the poles of one member of the motor, rotation of such a motor is assured and control may be had regarding direction of motor movement. Preferably, generation of secondary magnetic circuits linking the pairs of oppositely polarized poles are avoided. As a trade-off, however, some secondary circuits may be tolerated for the convenience of utilizing a unipolar drive to power the ECR motor.

I claim:

1. An electric machine powered by a polyphase source comprising:
    a first member of magnetic permeable material, having plurality of poles unevenly spaced relative to one another;
    a second member of magnetically permeable material, having a plurality of poles evenly spaced relative to one another;
    means for mounting said first and second members for relative movement such that said poles of said first and second members face one another;
    said poles of said first member being arranged in pairs such that the intra-pair spacing between poles of a pair is approximately equal to the even spacing of said poles of said second member and the inter-pair spacing between poles of different pairs is unequal to the even spacing of said poles of said second member such that at least one but not all of said pairs may be simultaneously aligned with said poles of said second member to form a low reluctance path between said first and second members; and
    means for forming a magnetic flux path bridging said first and second members which polarizes said at least one pair of poles of said first member to form salient magnetic poles of opposite polarity such that the portion of said flux path through said first member does not overlap any other flux paths found in said first member.

2. An electric machine as set forth in claim 1 wherein said means for forming a magnetic flux path includes a polyphase energization source which polarizes said at least one pair of poles of said first member to form salient magnetic poles opposite polarity such that the flux switching frequency in at least a portion of said first member is less than the commutation frequency of each phase of said polyphase source multiplied by the number of phases in said polyphase source.

3. An electric machine as set forth in claim 2 wherein said magnetic flux paths do not overlap one another in said first member.

4. An electric machine as set forth in claim 1 wherein said means for forming a magnetic flux path includes an energization source which controls the direction of said flux flow in said paths so as to prevent reversal of said flux flow in said first member.

5. An electric machine as set forth in claim 1 wherein said second member is a rotor rotatable about an axis and said first member is a stationary stator, said means for forming a magnetic flux path including windings wound about said poles of said stator.

6. An electric machine as set forth in claim 5 wherein said means for forming a magnetic flux path includes an energization source for said windings which controls the relative polarities of said poles of said stator so all flux flowing through adjacent stator poles also flows through a back iron area of said stator joining said adjacent stator poles.

7. An electric machine as set forth in claim 5 wherein said means for forming a magnetic flux path includes an energization source for said windings which controls the relative polarities of said poles of said stator so all flux flowing through a pair of stator poles also flows through a back iron area of said stator joining said pair of poles.

8. An electric machine as set forth in claim 1 wherein said plurality of poles of said first member are arranged such that neighboring poles of different pairs have the same polarity when polarized by said means for forming a magnetic circuit.

9. In the electric machine as set forth in claim 5, a method comprising the step of:
    energizing each of said pairs of stator poles such that a pole face of each pole in a pair is magnetically saturated while a back iron area of said stator which provides a flux path between said pair remains magnetically unsaturated relative to said pole faces.

10. An electric machine as set forth in claim 1 wherein said first and second members are without permanent magnets.

11. A motor powered by a polyphase source comprising in combination:
    a stator having a back iron and poles extending radially from and circumferentially spaced about said back iron;
    a rotor of magnetically permeable material and without windings or permanent magnets mounted for rotation about a longitudinal axis and having a generally cylindrical surface with poles extending radially therefrom;
    an air gap generating the pole faces of said stator and rotor poles;
    a plurality of windings associated with said stator poles and wired to said polyphase source so that each phase energizes at least one pair of circumferentially adjacent stator poles to form salient magnetic poles of opposite polarity which impart a torque to said rotor; and
    an area of said back iron bridging said at least one pair of circumferentially adjacent stator poles included in a magnetic circuit for the flux generated by said pair of stator poles when they are energized as salient poles such that said back iron area is not a part of any other magnetic circuit.

12. A motor powered by a polyphase source as set forth in claim 11 wherein said pole faces of said stator poles in each of said pairs of circumferentially adjacent stator poles are circumferentially separated by a first angle approximately equal to an angle separating neighboring poles of said rotor.

13. A motor powered by a polyphase source as set forth in claim 11 wherein said pole faces of said rotor poles are circumferentially unevenly spaced so as to form pairs of poles wherein the inter-pair spacing is approximately equal to the spacing between stator poles and the inter-pair spacing is unequal to the spacing between adjacent stator poles.

14. A motor powered by a polyphase source as set forth in claim 12 wherein each of said pole faces of said stator poles in one of said pairs of circumferentially adjacent stators poles is circumferentially separated from a pole face of a stator pole in a neighboring pair by a second angle that is not equal to said first angle or an integer multiple thereof.

15. In the motor as set forth in claim 11, a method comprising the step of:
   energizing the windings of said at least one pair of circumferentially adjacent stator poles such that said pole faces of said pair are magnetically saturated while said back iron area of said magnetic circuit generated by said at least one pair remains magnetically unsaturated relative to said pole faces.

16. In the motor as set forth in claim 11, a method comprising the step of:
   energizing the windings of at least two pairs of circumferentially adjacent stator poles such that circumferentially neighboring magnetic poles of different pairs are of the same polarity.

17. A motor comprising, in combination, a stator having a plurality of adjacent pole pairs with each pole a member of only one pair and windings on said pairs for forming a direct flux path between poles in each pair, a rotor having a plurality of equally spaced poles for forming a low reluctance path between stator poles in a pair, the windings on stator poles in a pair being oppositely wound to create a north/south magnetic field between said stator poles in a pair, said stator poles in a pair being spaced by a first distance related to the spacing between rotor poles, and adjacent stator pole pairs being separated from each other by a second distance so that energization of said stator pole pairs in a predetermined sequence causes movement of said rotor.

18. A motor as set forth in claim 17 wherein each pair of adjacent poles is joined by magnetically permeable material in order to provide a flux guide between the poles.

19. A motor as set forth in claim 18 wherein said magnetically permeable material is not saturated when said pair of adjacent stator poles is energized.

20. A motor as set forth in claim 17 wherein said motor is a linear motor having a linear rotor and stator.

21. A motor as set forth in claim 17 wherein said motor is a rotating motor where said rotor rotates about an axis.

22. In a motor as set forth in claim 17, a method comprising the steps of:
   simultaneously energizing more than one pair of poles such that at least a portion of a back iron area of said stator experiences a flux switching frequency less than the phase frequency multiplied by the number of phases in said polyphase source.

23. In a motor as set forth in claim 17, a method comprising the step of:
   simultaneously energizing more than one pair of poles such that neighboring poles of different energizing pairs are of the same polarity, thereby assuring the magnetic circuits formed are only those provided by the direct flux paths between poles in a pair.

24. A method as set forth in claim 23 wherein each direct flux path formed by a pole pair does not overlap the flux path of any other pole pair.

25. A motor comprising, in combination, a first member having a plurality of circumferentially spaced poles with equal spacing between the poles, a second member having a plurality of circumferentially spaced poles with angles between the poles alternating between first and second angles, means for polarizing said poles of said first and second members to form on each member at least one pair of adjacent salient poles of opposite polarity separated by said first angle such that said pairs of poles on said first and second members are drawn into radially aligned to form a low reluctance path between said pairs of salient poles, said second angle being different than said first angle so that polarization of said pairs of poles of said first and second members in a predetermined sequence causes different pairs of adjacent poles of said first and second members to be drawn into radial alignment, thereby causing relative rotation of said first and second members.

26. A motor as set forth in claim 25 where each pole of said first member is a member of only one pair of salient poles.

27. A motor as set forth in claim 26 where a magnetic circuit incorporating said low reluctance path is formed upon polarization of said poles of said first and second members to form said pairs of salient poles and each of said magnetic circuits do not overlap any other magnetic circuit.

28. In a motor as set forth in claim 27, a method including the step of:
   energizing said pairs of salient poles of said first and second members so that neighboring poles of two energized pole pairs on a member are of the same polarity.

29. In a motor as set forth in claim 25, a method including step of:
   arranging the polarities of the poles of said second member such that at least a portion of said second member experiences a flux switching frequency which is less than the frequency of said polyphase source multiplied by the number of phases in said polyphase source.

30. In a motor powered by a polyphase source having first and second members mounted for relative rotation and a plurality of poles on one of said members circumferentially arranged in a regular pattern so as to create alternating first and second angles, a method comprising the step of:
   polarizing adjacent ones of said poles to form pairs of adjacent salient magnetic poles where the poles of each pair are of opposite polarity.

31. A method as set forth in claim 30 including the step of:
   polarizing said pairs of adjacent salient poles such that neighboring poles of different pairs are of the same polarity, thereby preventing magnetic circuits forming between pairs.

32. A method of energizing a motor having unevenly spaced stator poles and evenly spaced rotor poles by a polyphase source, said method comprising the steps of:

energizing at least two pairs of adjacent poles of said stator by a phase of said polyphase source to form adjacent poles of opposite polarities; and arranging the relative polarities of said stator poles such that the flux switching frequency in at least a portion of the back iron area of said stator is less than the phase frequency multiplied by the number of phases.

33. A method as set forth in claim 32 wherein the relative polarities of the pairs of adjacent poles polarized by each phase provide a flux switching frequency in at least a portion of said back iron area of stator poles which is equal to the phase frequency.

34. A method as set forth in claim 32 including the step of:

arranging the relative polarities of said stator poles such that the flux reversal frequency in at least a portion of the back iron area of said stator is zero.

* * * * *